(12) United States Patent
Dupraz et al.

(10) Patent No.: US 9,373,473 B2
(45) Date of Patent: Jun. 21, 2016

(54) MECHATRONIC CIRCUIT BREAKER DEVICE AND ASSOCIATED TRIPPING METHOD AND USE THEREOF IN INTERRUPTING A HIGH DIRECT CURRENT

(71) Applicant: Alstom Technology LTD, Baden (CH)

(72) Inventors: Jean-Pierre Dupraz, Bressolles (FR); Wolfgang Grieshaber, Lyons (FR); Michel Collet, Lyons (FR)

(73) Assignee: Alstom Technology Ltd., Baden (CH)

( * ) Notice: Subject to any disclaimer, the term of this patent is extended or adjusted under 35 U.S.C. 154(b) by 190 days.

(21) Appl. No.: 14/368,281

(22) PCT Filed: Dec. 20, 2012

(86) PCT No.: PCT/EP2012/076399
§ 371 (c)(1),
(2) Date: Jun. 23, 2014

(87) PCT Pub. No.: WO2013/092873
PCT Pub. Date: Jun. 27, 2013

(65) Prior Publication Data
US 2015/0002977 A1    Jan. 1, 2015

(30) Foreign Application Priority Data

Dec. 23, 2011 (FR) ...................... 11 62413

(51) Int. Cl.
*H01H 73/00* (2006.01)
*H01H 71/10* (2006.01)
*H01H 9/54* (2006.01)
*H02H 9/00* (2006.01)
*H01H 33/59* (2006.01)

(52) U.S. Cl.
CPC ............... *H01H 71/10* (2013.01); *H01H 9/542* (2013.01); *H01H 9/548* (2013.01); *H02H 9/005* (2013.01); *H01H 33/596* (2013.01); *H01H 2009/543* (2013.01); *H01H 2009/544* (2013.01)

(58) Field of Classification Search
CPC ....... H01H 71/10; H01H 9/548; H01H 9/542; H02H 9/005
See application file for complete search history.

(56) References Cited

U.S. PATENT DOCUMENTS

| | | | |
|---|---|---|---|
| 2005/0146814 A1* | 7/2005 | Sellier | H01H 3/222 361/8 |
| 2009/0201617 A1* | 8/2009 | Yamaguchi | H01H 9/40 361/93.9 |
| 2010/0006544 A1* | 1/2010 | Onufriyenko | H01H 73/045 218/154 |

FOREIGN PATENT DOCUMENTS

| | | |
|---|---|---|
| DE | 3416914 A1 | 11/1984 |
| EP | 1 538 645 A1 | 6/2005 |

(Continued)

OTHER PUBLICATIONS

International Search Report and Written Opinion in International Application No. PCT/EP2012/076399, mailed Mar. 15, 2013.

(Continued)

*Primary Examiner* — Thienvu Tran
*Assistant Examiner* — Tien Mai
(74) *Attorney, Agent, or Firm* — Nixon Peabody LLP; Khaled Shami

(57) ABSTRACT

The invention relates to a new mechatronic circuit-breaker and its associated triggering method for breaking either alternating currents or direct currents at high voltages.

21 Claims, 14 Drawing Sheets

(56) References Cited

FOREIGN PATENT DOCUMENTS

| WO | 2011/057675 | 5/2011 |
|---|---|---|
| WO | 2013/092878 | 6/2013 |

OTHER PUBLICATIONS

French Preliminary Search Report in French Application No. 1162413, dated Sep. 4, 2012.

* cited by examiner

MECHATRONIC CIRCUIT BREAKER DEVICE AND ASSOCIATED TRIPPING METHOD AND USE THEREOF IN INTERRUPTING A HIGH DIRECT CURRENT

CROSS-REFERENCE TO RELATED PATENT APPLICATION

The present application is a National Stage Application of International Application No. PCT/EP2012/076399 entitled "Mechatronic Circuit Breaker Device And Associated Tripping Method And Use Thereof In Interrupting A High Direct Current" filed Dec. 20, 2012, which claims priority of French Patent Application No. 1162413, filed Dec. 23, 2011, the contents of each are incorporated herein by reference in their entirety.

TECHNICAL FIELD

The invention relates to a new mechatronic circuit-breaker device and its associated triggering method.

The main target application of the invention is to breaking high direct currents in a transmission and/or distribution line, typically at peak-to-peak voltage levels exceeding 50 kilovolts (kV) (DC), up to 800 kV (DC) and beyond. The expression high-voltage direct current (HVDC) is commonly used for this field of application.

The invention may also be applied to breaking direct currents at lower peak-to-peak voltages, typically in the range 1 kV to 50 kV, or to breaking alternating currents.

PRIOR ART

Breaking currents in high-voltage direct current (HVDC) transmission and/or distribution networks has become of crucial importance because mastery thereof directly conditions the expansion of said networks.

At present, a consensus seems to be emerging among all network players as to the approach to be adopted to effect such breaking: it is necessary, to break currents in a time less than a few milliseconds, to produce a device forming a mechatronic circuit-breaker by combining at least one semiconductor component breaker cell electrically in parallel with an energy absorber and with at least one mechanical switch-disconnector capable firstly of passing the steady current in its closed position with minimum insertion losses and thus avoiding high losses in the semiconductor breaker component or components and secondly of withstanding the recovery voltage at the terminals of the device in its open position.

There may be mentioned here patent application EP1538645 which initiated the mechatronic circuit-breaker principle. Although ideally adaptable to breaking high direct currents with IGCT thyristors as the breaker semiconductor components, it appears that the Thomson-type mechanical switch shown in FIG. 5A was not actually usable. Moreover, on reading the above document, it is not really clear whether and how it is possible to break direct currents at very high peak-to-peak voltage levels, typically exceeding 50 kV. Moreover, the mode of automatic turning off of the thyristors in the auxiliary branch presupposes that the time for which the mechanical switch is fully open is shorter than the inherent half-period of the oscillatory circuit used for switching from the main branch to the auxiliary branch. This dependency is deleterious because the criteria for choosing the inherent frequency of this oscillatory circuit may lead to inherent frequencies that are too high given the technologies available for the production of the mechanical switch. Moreover, the above patent application EP1538645 assumes that it is possible to create oscillation of the primary current itself such that the current crosses zero, a necessary condition for the IGCT thyristors to be able to turn themselves OFF. In reality, the electromagnetic energy present in the network L at the time the fault occurs is such that the insertion of the oscillatory circuit has no significant effect on the primary current. In other words, this principle is not applicable to direct current energy transmission applications when the nominal primary magnitudes respectively exceed a current of 1 kiloamp (kA) and a voltage of 100 kV.

It has more recently been proposed in patent application WO 2011/057675 to produce a mechatronic circuit-breaker device of this kind comprising a main branch, i.e. that carrying the steady current under nominal conditions, with a mechanical switch-disconnector electrically in series with a breaker cell constituted of an IGBT transistor, an anti-parallel diode, a shunt varistor, and a single auxiliary branch with a plurality of breaker cells each constituted of an IGBT transistor and an anti-parallel diode, the intrinsic resistance of the auxiliary branch being much lower than that of the main branch. Such a mechatronic circuit-breaker is assumed to function in the following manner: under steady conditions, the IGBT transistor is in the ON state and the mechanical switch-disconnector is closed, all the IGBT transistors of the breaker cells of the auxiliary branch are in the OFF state. Under steady conditions, the steady current therefore flows in the main branch. In the event of a fault on the HDVC transmission line, which is reflected at least in a current surge, all the IGBT transistors of the breaker cells of the auxiliary branch switch to the ON state and the IGBT transistor of the breaker cell of the main branch switches to the OFF state. All the current is switched into the auxiliary branch, the mechanical switch-disconnector is then opened. All the IGBT transistors of the breaker cells of the auxiliary branch then switch over to the non-conducting state and the current is then switched to the varistor. The current is then broken and the voltage surge limited.

A mechatronic circuit-breaker of the above kind has numerous disadvantages. Firstly, it is indicated (see page 19, lines 7-18) that if, as a result of future development work, an electromechanical circuit-breaker were produced capable of accomplishing the same functions as a present-day semiconductor (IGBT transistor) circuit-breaker, typically capable of breaking a current of 2 kA in less than 1 millisecond (ms) and capable of withstanding a voltage of 2 kV, then that type of circuit-breaker could be included on its own in the main branch instead of the IGBT transistor and the series-connected mechanical switch-disconnector. Now, producing such an electromechanical circuit-breaker would require firstly very costly development work and secondly increased maintenance by virtue of the creation of an arc and thus of the associated wear. Moreover, in all the embodiments proposed in the above application WO 2011/057675, no device is provided firstly for enabling protection of the IGBT transistors provided in the main branch, i.e. that carrying the steady current in the nominal regime, and secondly for facilitating switching the current to the auxiliary branch during switching from the ON state to the OFF state. Finally, the major drawback of the proposed mechatronic circuit-breaker is that its operation assumes a very high driving power for effecting the instantaneous switching of all of the IGBT transistors of the main branch. The mechatronic circuit-breaker described in the patent application WO 2011/057675 would not work, as the time to establish the current in the branches has been ignored. That time may be extremely long given the large dimensions necessary in the claimed applications to voltages exceeding 100 kV, for example. Furthermore, controlling IGBT transistors in this way is in practice complex.

The object of the invention is thus to propose a new mechatronic circuit-breaker device that alleviates some or all of the drawbacks of the prior art referred to above, and notably those of the above-mentioned patent applications EP1538645 and WO 2011/057675.

A particular object is to propose a mechatronic circuit-breaker device suitable both for breaking alternating currents in a very wide range of voltages, typically in the range 15 kV to 145 kV, and for breaking direct currents, typically at peak-to-peak voltages in the range 40 kV (DC) to 600 kV (DC) and for a wide range of currents, typically in the range 1.5 kA to 4.5 kA.

STATEMENT OF THE INVENTION

To this end, the invention provides a mechatronic circuit-breaker device adapted to break an electrical current flowing through electrical power transmission means, comprising:
  a main branch comprising at least one main module comprising at least one sub-branch comprising at least one mechanical switch-disconnector connected in series with at least one breaker cell constituted of at least one power semiconductor element with controlled duty ratio;
  an auxiliary branch electrically in parallel with the main branch and comprising:
  at least one first sub-branch, called the timing sub-branch, defining a leakage inductance of the timing sub-branch relative to the main branch and the distributed resistance of all the components of the timing sub-branch and comprising at least one first breaker cell constituted of a plurality of power thyristors in cascade, at least one of the timing sub-branches further comprising at least one first switching-assistance module with at least one first capacitor electrically in parallel with its discharge resistance and a voltage surge limiter; and
  a second sub-branch, called the arming sub-branch, electrically in parallel with the timing sub-branch and defining a leakage inductance of the arming sub-branch relative to the timing sub-branch and the distributed resistance of all the components of the arming sub-branch and comprising at least one second breaker cell constituted of a plurality of power thyristors in cascade and at least one second switching-aid module comprising at least one second capacitor electrically in parallel with its discharge resistor and a voltage surge limiter; and
  at least one main voltage surge limiter electrically in parallel with the main branch.

Note that by "power thyristor" is meant a thyristor in the general sense, i.e. a semiconductor electronic switch that may be turned on by its trigger but not turned off, turning it off being triggered by the current at its input crossing zero. Thus it may also refer to its variants known as pulsed power thyristors (PPT) or gate turn-off (GTO) thyristors, whether produced on semiconductors of silicon, silicon carbide, or gallium nitride type or any other semiconductor element suitable for high-voltage power switching applications.

Thus each leakage inductance defined in this way comprises at least the self-inductance of the sub-branch concerned when it is associated with the main branch or with the other sub-branch. With this self-inductance there may be associated an additional series inductance the role of which will be to limit drift of the current relative to time, denoted di/dt, when current is established in the next sub-branch.

Moreover, the power thyristors of each sub-branch, given the large dimensions resulting from the use of a plurality thereof, contribute to the value of the leakage inductance.

Similarly, each distributed resistance comprises at least the resistance of the conductors and the components constituting the sub-branch concerned, that resistance being considered from the point of view of high frequencies, i.e. taking account of the skin effect. The resistance value increases with frequency. To this inherent resistance there is added a resistance that may be distributed within the multiple components and the role of which is, in association with the inductance, to control the di/dt value of the current whilst adopting the conditions necessary for fast switching, i.e. a value lower than that leading to a critical damped regime.

In a variant, each switching-assistance module may comprise an inductor and a resistor in series with the plurality of thyristors to which they are connected.

Thus the basic idea of the invention is to propose a multi-branch mechatronic circuit-breaker architecture with firstly a main branch enabling a steady current to pass with very low losses under steady conditions and with at least one mechanical switch-disconnector able to withstand the recovery voltage at the terminals of the device in its open position, a main voltage surge limiter enabling simultaneously, in the event of a current surge occurring in the main branch:
  total extinction of the current;
  temporary storage of the electromagnetic energy present in the line at the moment of opening the main branch; and
  evacuation of that energy to ensure the safety of persons in the event of maintenance intervention, and sufficiently quickly to authorize rapid working cycles if necessary.

The rating of the voltage surge limiter is of course adapted to the voltage of the electrical energy transmission means into which the mechatronic circuit-breaker is inserted and to the energy to be stored and then dissipated. It determines the maximum value of the transient recovery voltage at the terminals of the device. It also determines the speed of definitive elimination of the fault, which increases as the threshold voltage of the limiter increases.

The invention provides an auxiliary branch that enables simultaneously, either on the occurrence of a current surge in the main branch or the reception of a specific instruction:
  transfer of the current from the main branch to the main voltage surge limiter;
  control of the voltage at the terminals of the device to guarantee that, during the breaking stage, it remains below the dielectric strength rating of all its components; and
  control of the evolution of the transient recovery voltage, in particular its rate of increase.

In an advantageous embodiment, in order to break a current that may arrive in one direction or in the opposite direction via the energy transmission means, each sub-branch of a main module comprises at least one mechanical switch-disconnector connected in series between two breaker cells using power semiconductors and connected in anti-parallel with each other.

An advantageous variant of the mechatronic circuit-breaker device of the invention further comprises a rate of voltage increase limiter electrically in parallel with each breaker cell of a main module, the rate of increase limiter being constituted of a diode electrically in series with a capacitor, itself electrically in parallel with its discharge resistor. A voltage surge limiter electrically in parallel with each breaker cell of a main module may advantageously also be provided.

In a preferred variant, each breaker cell of a sub-branch of a main module is constituted of at least one power semiconductor element with a controlled rate of conduction and each sub-branch of a main module comprises a diode connected in anti-parallel with a breaker cell.

In a variant the power semiconductor component with control duty ratios of a breaker cell of a main module is an insulated gate bipolar transistor (IGBT).

In a preferred variant the controlled duty ratio power semiconductor element of a breaker cell of a sub-branch of a main module is constituted of at least one field-effect transistor and an insulated gate bipolar transistor (IGBT) connected electrically in series with the field-effect transistor by connecting the drain of the field-effect transistor to the emitter of the IGBT transistor, their gates G being connected to a control circuit ensuring switching behavior of the cascode circuit type. As a function of the value of the steady current to be carried, the main branch comprises a plurality of main modules electrically in parallel with each other, advantageously with each main module including a plurality of sub-branches electrically in parallel with each other. In a preferred embodiment the auxiliary branch comprises at least two timing sub-branches electrically in parallel with each other, the second timing sub-branch comprising at least one third breaker cell constituted of a plurality of power thyristors in cascade and at least one third switching-aid module with at least one third capacitor, at least one third inductor, and at least one third resistor electrically in series with the third capacitor, itself electrically in parallel with its discharge resistor and a voltage surge limiter itself in series with a resistor.

In a preferred variant each mechanical switch-disconnector of each sub-branch of each main module is constituted of two vacuum interrupters electrically in series.

The invention also provides a set of electrical switchgear intended to be installed in high-voltage alternating current or direct current electrical energy transmission means, comprising a mechatronic circuit-breaker as described above and at least one electrical grounding switch connected in series with each of the two terminals of the mechatronic circuit-breaker.

This set of switchgear advantageously comprises a bridging switch connected electrically in parallel to the terminals of the mechatronic circuit-breaker and adapted on command and for a particular time period to cause a transient current greater than the breaking capacity of the mechatronic circuit-breaker to flow from one terminal to the other of the circuit-breaker without passing therethrough.

It preferably further comprises on either side of the terminals of the hybrid circuit-breaker a disconnector electrically in series with the mechatronic circuit-breaker and externally of the electrical connecting terminals of the grounding switches. The set of switchgear advantageously further comprises, between an electrical connecting terminal of a grounding switch and a disconnector, a switch or a device for inserting an electrical resistor in electrical series with the last one. The value of the resistor to be inserted is preferably equal to the characteristic impedance of the line or of the cable to which the mechatronic circuit-breaker of the invention is electrically connected in series. Accordingly, the electrical resistor preferably has a resistance value in the range 100 ohm (Ω) to 1000 Ω.

In a preferred variant, the set of switchgear comprises an additional circuit-breaker electrically in series with the mechatronic circuit-breaker device, the additional circuit-breaker being adapted to break low currents. The low currents to be broken are typically less than 100 amps (A). Such an additional circuit-breaker may be a metallic return transfer breaker (MRTB). It may also be a mechanical arc-extinction type circuit-breaker.

The switchgear and the additional circuit-breaker are advantageously of modular design individually or in combination.

The invention further provides a method of triggering a mechatronic circuit-breaker device as described above, wherein only in the presence of a steady current in the main branch, and in the absence of a specific instruction, each switch-disconnector is maintained in the closed position and the set or sets of controlled duty ratio power semiconductors in the ON state and the set of power thyristors of the auxiliary branch in the OFF state, and wherein either in the event of a current surge in the main branch of the device or on reception of a specific instruction, it comprises the following steps:

a) switching from the ON state to an OFF state of the controlled duty ratio power semiconductor element or elements whilst maintaining each switch-disconnector closed so as to divert all of the current into the at least one timing sub-branch for a time period necessary for each mechanical switch-disconnector to open;

b) synchronously with the step a), switching the power thyristors of at least one timing sub-branch from the OFF state to an ON state to achieve a voltage level at the terminals of the main branch and of the auxiliary branch enabling current to flow neither in the main branch nor in the arming branch nor in the voltage surge limiter, to enable subsequent switching from the OFF state to an ON state of the power thyristors of the arming branch in the open position of each mechanical switch-disconnector, and allowing subsequent switching from the ON state to the OFF state of the power thyristors of the at least one timing sub-branch in the open position of each mechanical switch-disconnector;

c) when step b) has been completed, opening each mechanical switch-disconnector;

d) when step c) has been completed and when each mechanical switch-disconnector has reached its open position, switching the power thyristors of the arming sub-branch from the OFF state to an ON state to achieve a voltage level at its terminals enabling diversion of all of the current to the voltage surge limiter or limiters; and e) extinction of the current by the main voltage surge limiter or limiters.

In an advantageous variant, there is further effected a step f) of eliminating any residual leakage currents by opening at least one disconnector in series with the mechatronic circuit-breaker of the invention.

The invention relates finally to a monitoring and control system employing the method described above.

BRIEF DESCRIPTION OF THE DRAWINGS

Other advantages and features of the invention become more clearly apparent on reading the detailed description given with reference to the following figures, in which.

DETAILED DESCRIPTION OF PARTICULAR EMBODIMENTS

Although specifically described with reference to the application of breaking high direct currents in a distribution and/or transmission line, other applications of the invention may be envisaged.

In particular, the mechatronic circuit-breaker of the invention may be used to break alternating currents.

The mechatronic circuit-breaker of the invention may also be used in a gas-insulated line (GIL).

Figure 1:
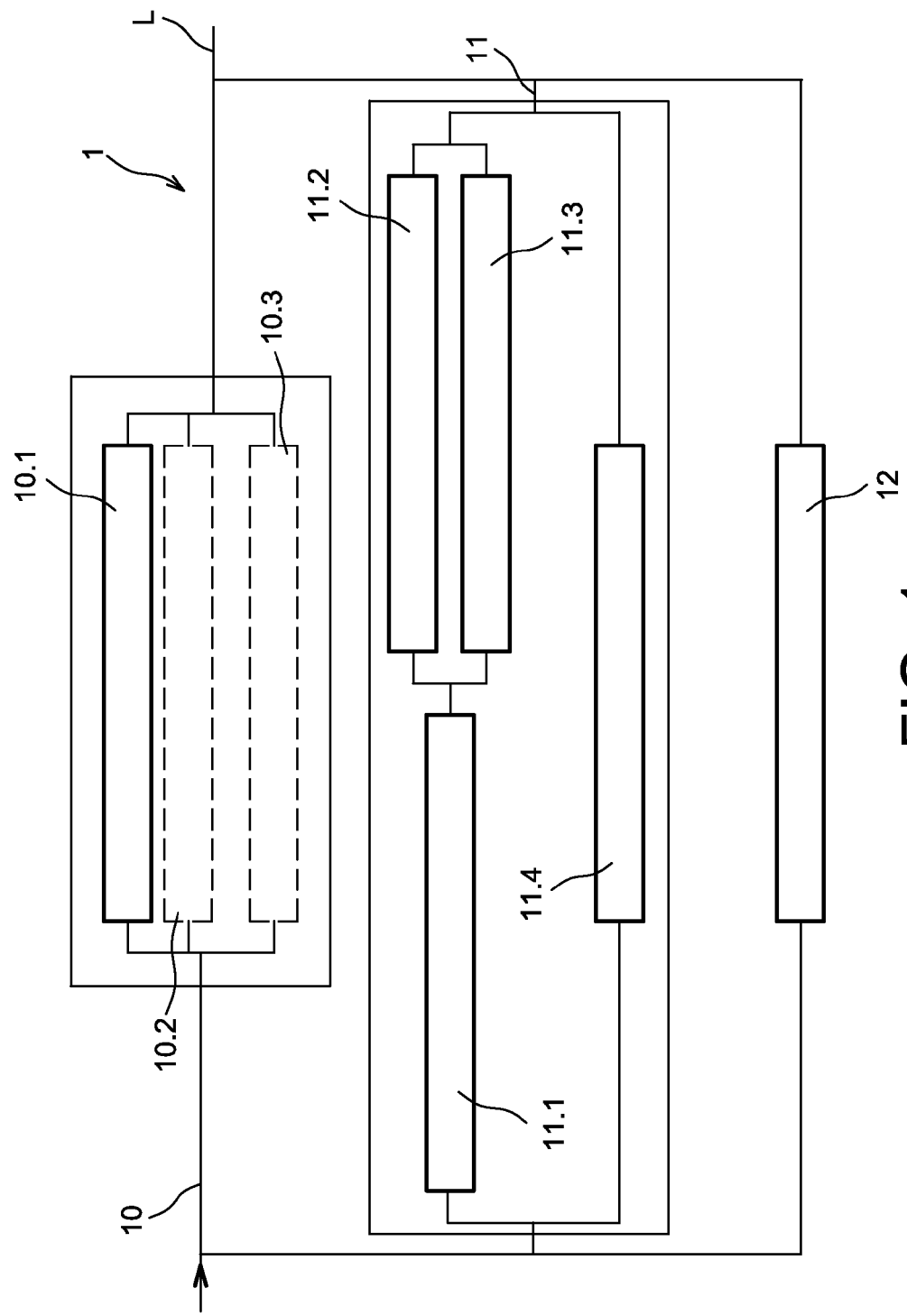
FIG. 1 is a diagram of the overall electrical architecture of a mechatronic circuit-breaker device of the invention.

FIG. 1 shows an overall electrical architecture of a mechatronic circuit-breaker device 1 of the invention intended to break high direct currents in transmission networks L in a peak-to-peak voltage range up to 320 kV DC. The inventors moreover believe that in the future a mechatronic circuit-breaker of this kind could break direct currents in a peak-to-peak voltage range up to 500 kV or even beyond.

Such a device 1 comprises firstly a main branch 10 in which the primary current flows under steady conditions. It comprises a plurality of identical main modules 10.1, 10.2, 10.n electrically in parallel with one another. Each of the main modules 10.1, 10.2, 10.n is in turn constituted of a plurality of functionally identical sub-branches electrically in parallel with one another. The functions of each branch and sub-branch and their associated electronic components are described for current-interrupting operations, i.e. on the occurrence of a fault in the network L in which the hybrid circuit-breaker of the invention is integrated, which is reflected at least in a current surge.

Each main module comprises at least one mechanical switch-disconnector 100 electrically in series with two electronic switching-assistance sub-modules. The higher the voltage of the network in which the mechatronic circuit-breaker of the invention is integrated, the greater the consequential increase in the number of mechanical switch-disconnectors connected in series. A mechanical switch-disconnector is preferably constituted of two vacuum interrupters in series, typically having a breaking capacity that can reach an alternating current of a few kA. An electromagnetic actuator developed specifically for operating mechanical switch-disconnectors of the invention is described and claimed in the patent application filed the same day as the present application, WO 2013/092878, published Jun. 27, 2013, and entitled "Actionneur à aimants permanents et interrupteur mécanique actionné par un tel actionneur" ["Permanent magnet actuator and mechanical switch actuated by such an actuator"].

Each electronic switching-assistance sub-module on either side of the mechanical interrupter-disconnector(s) comprises one or more controlled duty ratio power semiconductor components. These are preferably silicon-based insulated gate bipolar transistors (IGBT). They may equally be components based on silicon carbide, currently at the development stage, such as JFET/BJT hybrid transistors, or even GTO thyristors. Each sub-module provides the following functions:

connecting in parallel a plurality of sub-branches of a plurality of mechanical switch-disconnectors;

measuring the current flowing in each of these sub-branches;

dynamically balancing the currents in each of these sub-branches to control heating of the various components of the sub-branches.

The controlled duty ratio power semiconductor components provides the following functions:

in the conducting state, by controlling either their conductivity or their duty ratio defined as the ratio of their ON time to the sum of their ON time plus their OFF time, to adjust the current in each of the sub-branches of the same main module 10.1, 10.2, . . . , 10.n to ensure thermal balancing of the components of the sub-branches of that module, and also adjustment of the current in each of the main modules 10.1, 10.2, . . . , 10.n to ensure thermal balancing thereof;

enabling fast switching of the current from the main branch 10 to the auxiliary branch 11, as explained below;

enabling the main branch to return to the conducting state; and deactivating one or more sub-branches of the same main modules 10.1, 10.2, . . . , 10.n if the current in a sub-branch differs abnormally from the average of the currents in the other sub-branches, this deactivation giving rise to the remote signaling of a fault and enabling the components affected by the fault to go to a safe state.

In the ON state, given the relatively high current flowing through them and the voltage drop at their terminals, each of the electronic components of an electronic switching-assistance sub-module dissipates a great amount of heat. The mounting of these components therefore ensures correct dissipation of this heat.

This dissipation is preferably effected passively, by natural convection of the air or gas surrounding the electronic switching-assistance sub-modules, and by means of a geometrical orientation of said sub-modules to optimize such convection.

In a preferred embodiment, the IGBT transistors are equipped with diodes connected in anti-parallel.

In parallel with the main branch 10 there is provided an auxiliary branch 11 with three timing sub-branches 11.1, 11.2, 11.3 and one arming sub-branch 11.4.

Each of the sub-branches 11.1, 11.2, 11.3, 11.4 comprises a plurality of power thyristors in cascade. For some applications, the direction of the primary current may be reversed. This obviously happens with alternating current, but also with direct current if the location of the circuit-breaker 1 is such that the direction of the flow of power through it may be reversed. This happens typically in interconnected high-voltage direct current (HDVC) networks. In this situation, the plurality of power thyristors is then duplicated in each sub-branch so that each plurality is dedicated to one current-flow direction, and the pluralities of thyristors are therefore interconnected in anti-parallel.

A plurality of power thyristors formed by the series connection of a plurality of groups may be envisaged, the number of groups depending on the operating voltage to which the mechatronic circuit-breaker of the invention is subjected.

This may be done for reasons of industrial convenience, such as the limit weight for the objects to be manipulated, the reasonable maximum height beyond which it is impossible to guarantee correct compression of each plurality of thyristors, etc. A group is preferably constituted of ten identical power thyristors in cascade.

Each high-voltage power thyristor is associated with its gate control module, its transfer capacitor or capacitors, and a plurality of other components intended to contribute to its control, its monitoring, and to its safety measures, to form a plurality of thyristors in cascade.

A gate control module controls a power thyristor with which it is associated. It therefore provides the following functions:
- receiving a status report request delivered by another, preceding gate control module or by a monitoring and control system, depending on its position in the sub-branch concerned;
- copying and forwarding this signaling to the next gate control module, or to the monitoring and control system, depending on its position in the branch concerned, reception by the monitoring and control system of this copy meaning that all the gate control modules involved are in a correct operating state, its non-reception meaning that at least some of the control modules involved are not in a correct operating state, this information enabling the monitoring and control system to send remote fault signaling if necessary and to apply a safety strategy for the mechatronic circuit-breaker, for example preventing any operation that could not be completed;
- receiving an instruction to conduct as delivered by another, preceding gate control module or by a monitoring and control system, depending on its position in the sub-branch concerned;
- copying and forwarding that instruction to the next gate control module or to the monitoring and control system, depending on its position in the branch concerned;
- executing this instruction, delivering to the power thyristor the control pulse that it requires to go from the non-conducting (OFF) state to the conducting (ON) state;
- storing the energy necessary for the thyristor to begin to conduct;
- protecting the power thyristor with which it is associated against voltage surges via one or more voltage surge limiters of the ZnO or power Zener diode type, which are known as Transil diodes.

Each gate control module of a given power thyristor draws its energy from the current that flows through it when a voltage appears at the terminals of the transfer capacitors with which it is associated. The function of these capacitors is therefore to transfer energy into the gate control modules. They form a chain, each link of which is constituted by a transfer capacitor and gate control modules, and where appropriate by other components such as damping resistors. The combination of the control modules and the transfer capacitors is electrically in parallel with a plurality of power thyristors.

The function of the first timing sub-branch 11.1 is to provide the greater part of the dielectric strength of the timing branches, especially on the appearance of the recovery voltage at its terminals.

The second timing sub-branch 11.2 provides the following functions:
- diverting the current for sufficient time for each mechanical switch-disconnector to begin to open and to be able to withstand a first voltage level;
- ensuring a voltage drop sufficiently small not to lead to conduction in the voltage surge limiters connected in parallel to the power semiconductor components of the main branch 10;
- ensuring a voltage drop sufficiently high to facilitate switching of the current to the third timing sub-branch 11.3 at the appropriate time; and
- storing a voltage sufficient to turn off its own power thyristors when the third timing sub-branch 11.3 begins to conduct.

Note that the use of two timing sub-branches 11.2, 11.3 is rendered necessary mainly by the di/dt and du/dt limitations of the power thyristors, but also by the withstand voltages of the controlled duty ratio power semiconductor components (IGBT), the voltage surge limiters, and also the voltage and voltage surge values of the network. At the time of starting conduction in the arming sub-branch 11.4, the third timing sub-branch 11.3 develops a voltage of the order of 10% to 20% of the recovery voltage at the terminals of the mechatronic circuit-breaker 1 in order to limit di/dt stresses on the power thyristors by inserting series inductors that increase the voltage level required for switching from one branch to the next.

The third timing sub-branch 11.3 must provide the following functions:
- diverting the current from the second timing sub-branch 11.2 to itself once the mechanical switch-disconnectors have reached a first level of opening and for the time necessary for each mechanical switch-disconnector to acquire the dielectric strength necessary to be able to withstand the recovery voltage at the terminals;
- ensuring a voltage drop sufficiently low not to lead to dielectric breakdown of each mechanical switch-disconnector;
- ensuring a voltage drop sufficiently high to facilitate switching of the current present in said sub-branch 11.3 to the arming sub-branch 11.4 at the appropriate time; and
- storing sufficient voltage and energy to turn off its own power thyristors on starting conduction in the arming sub-branch 11.4.

The essential function of the arming sub-branch 11.4 is to insert a variable instantaneous impedance into the circuit. The instantaneous impedance may be defined as the ratio of the instantaneous voltage at its terminals to the instantaneous current that flows through it. In other words, the arming sub-branch 11.4 must therefore:
- at the time its conduction starts, have a very low instantaneous impedance, so that the whole of the primary current is diverted to it;
- while it is conducting, have an increasing instantaneous impedance so that the voltage at its terminals causes conduction to start in the main voltage surge limiter 12; and
- after its conduction period, have a very high impedance so that the residual leakage current, if any, flowing through it is negligible.

In each of the second and third timing sub-branches 11.2 and 11.3 and the arming sub-branch 11.4 there is provided at least one electronic switching-assistance module that provides the following functions in its own sub-branch:
- limiting the drift of the current relative to time, denoted di/dt;
- maintaining a constant voltage at the terminals of the mechatronic circuit-breaker for the module of the second timing sub-branch 11.2;

developing an increasing voltage so as to enable switching to the arming sub-branch 11.4 for the module of the third timing sub-branch 11.3; and developing a voltage sufficiently high to enable switching to the main voltage surge limiter 12 for the module of the arming sub-branch 11.4.

An electronic switching-assistance module is constituted by the parallel connection of at least one capacitor, a resistor for discharging that capacitor, and for two timing sub-branches 11.2, 11.3 an auxiliary voltage surge limiter (surge arrester). It may be associated with one or more inductors in series, as well as one or more resistors in series.

The mechatronic circuit-breaker of the invention finally comprises a main voltage surge limiter 12 electrically in parallel with the main branch 10 that provides the following functions:

ensuring total extinction of the current;

temporarily storing the electromagnetic energy present in the line at the moment of opening the main branch 10; and if necessary, evacuating this energy sufficiently quickly to authorize equally fast operating cycles.

In a preferred embodiment, the voltage surge limiter 12 is constituted of a set of ZnO-type surge arresters.

A mechatronic circuit-breaker 1 of one embodiment of the invention is described below with reference to FIGS. 2 to 2H.

Note here that the indices l relate to the electricity transmission line L into which the mechatronic circuit-breaker of the invention is inserted: thus $U_l$, $R_l$, $L_l$ respectively designate the high-voltage level, the resistance, the inductance of the line L.

Note here that the indices a relate to the electronic components of the mechatronic circuit-breaker that are dedicated to one direction of current flow (from right to left in the figures concerned). The indices b relate to the electronic components that are dedicated to the current flow in the direction opposite to the direction a. For clarity, because the components a concerned are identical to and electrically connected in anti-parallel with the components b dedicated to the opposite direction of the current only the components a are described. Clearly the arrangement is symmetrical with the exception of the free-wheel diodes of the transistors IGBT, one denoted 1011a operating with the IGBT transistor 1010a with which it is not in anti-parallel, the other diode denoted 1011b operating with the transistor 1010b with which it is not in anti-parallel either. Note furthermore that in FIG. 2i the diodes 1011a and 1011b are shown in anti-parallel with the respective breaker cell 101b, 101a and not with the respective controlled duty ratio power semiconductor 1010b, 1010a, as in FIG. 3. The diodes 1011a and 1011b are preferably components entirely separate from the breaker cells 101b, 101a.

Figure 2:
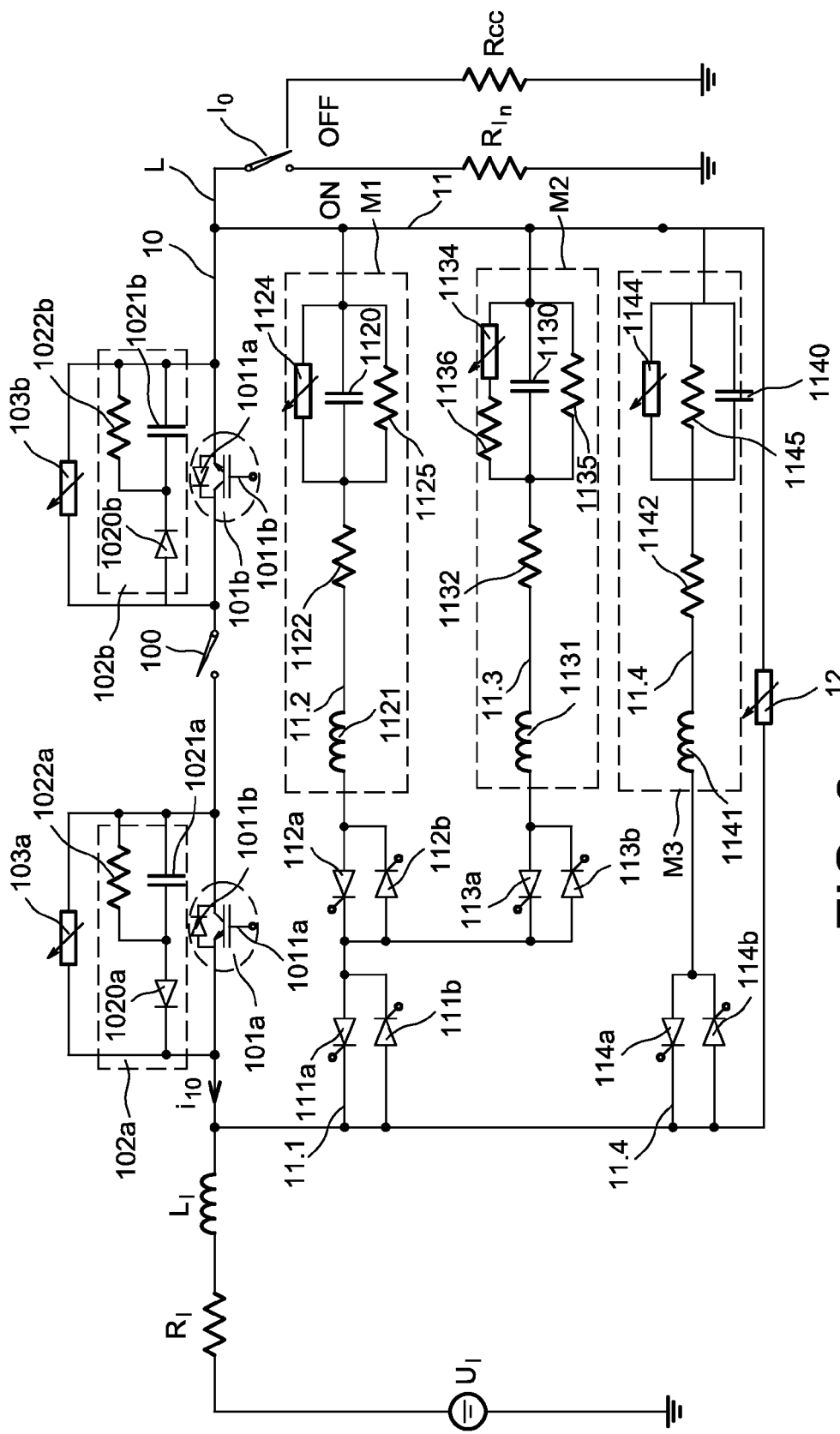
FIG. 2 is an electrical circuit diagram of a first embodiment of the hybrid circuit-breaker device of the invention.
Figure 2A:
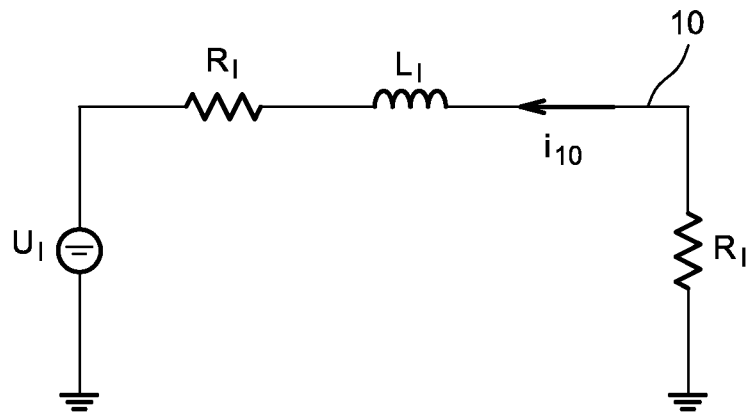
FIGS. 2A to 2H are equivalent electrical circuit diagrams of the FIG. 2 mechatronic circuit-breaker as a function of various triggering steps in response to the occurrence of a fault current.
Figure 2B:
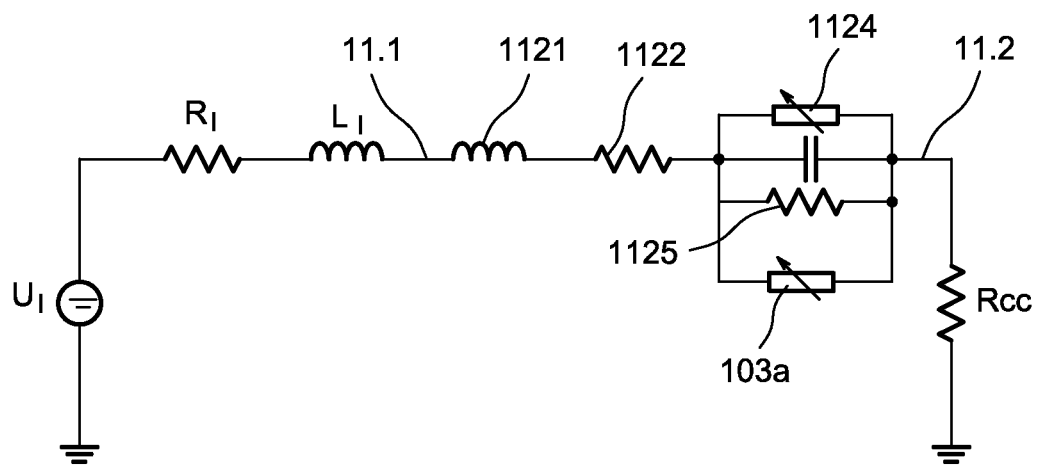
Figure 2C:
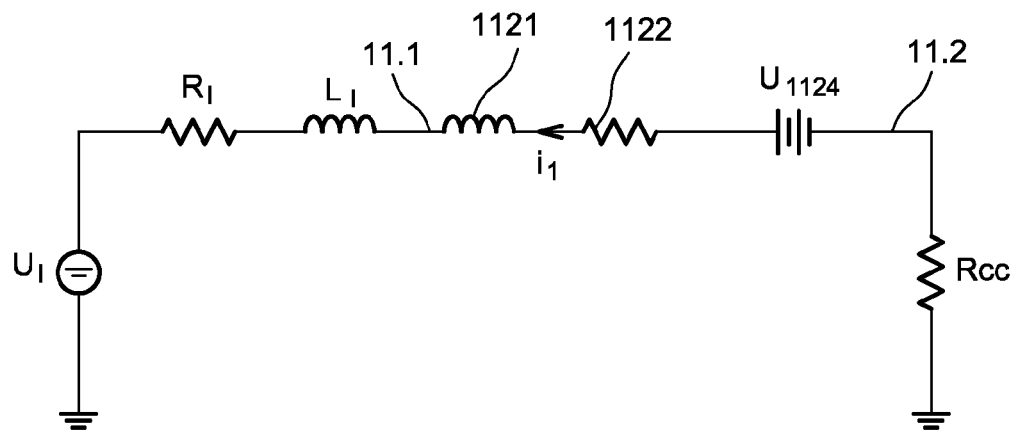
Figure 2D:
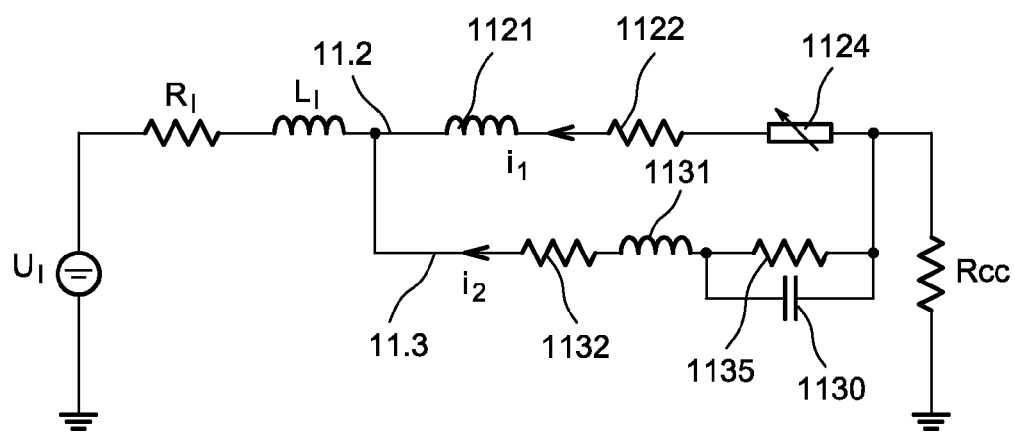
Figure 2E:
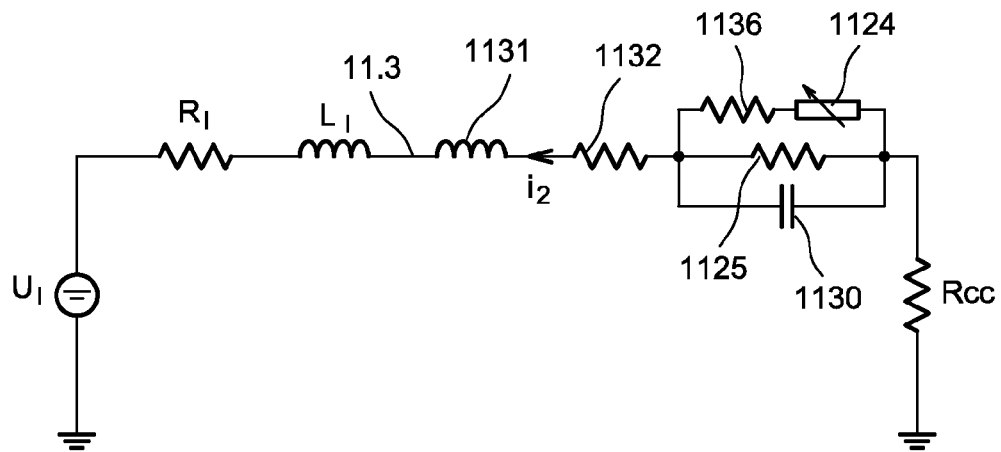
Figure 2F:
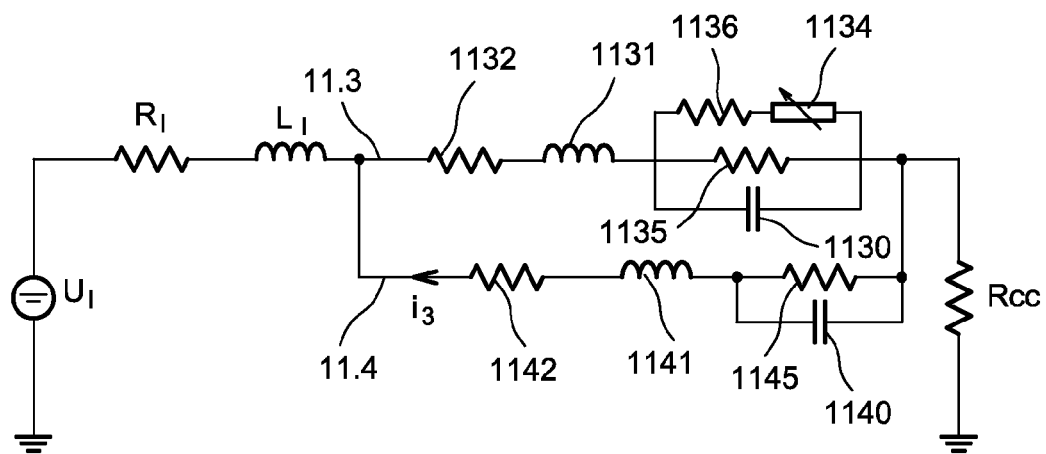
Figure 2G:
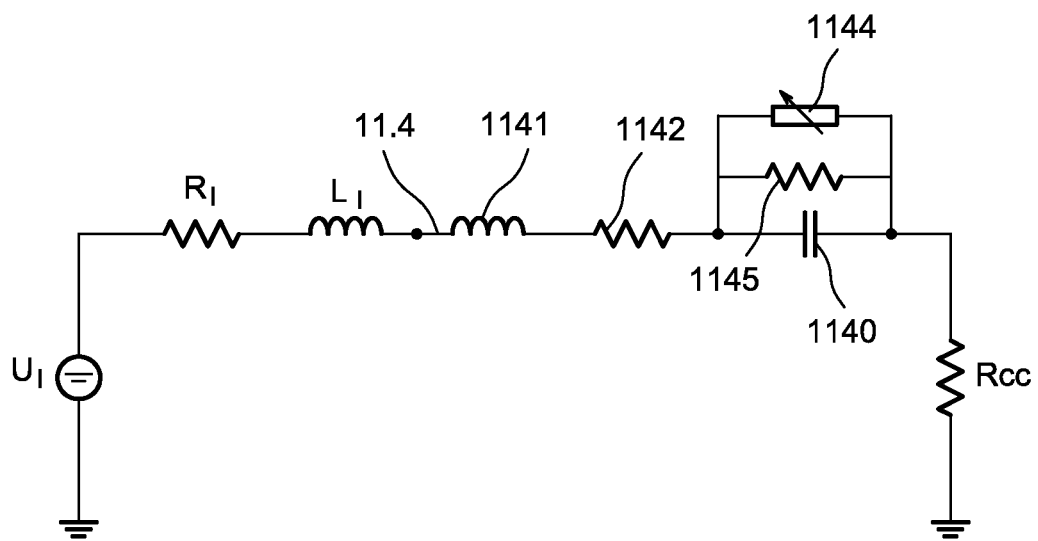
Figure 2H:
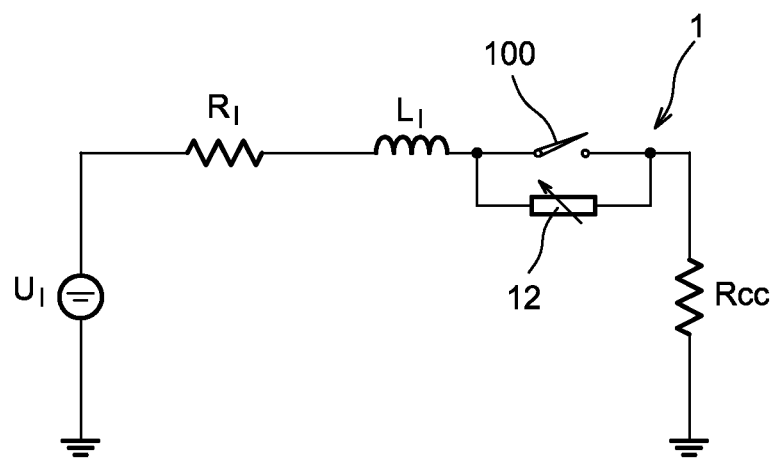
Figure 2I:
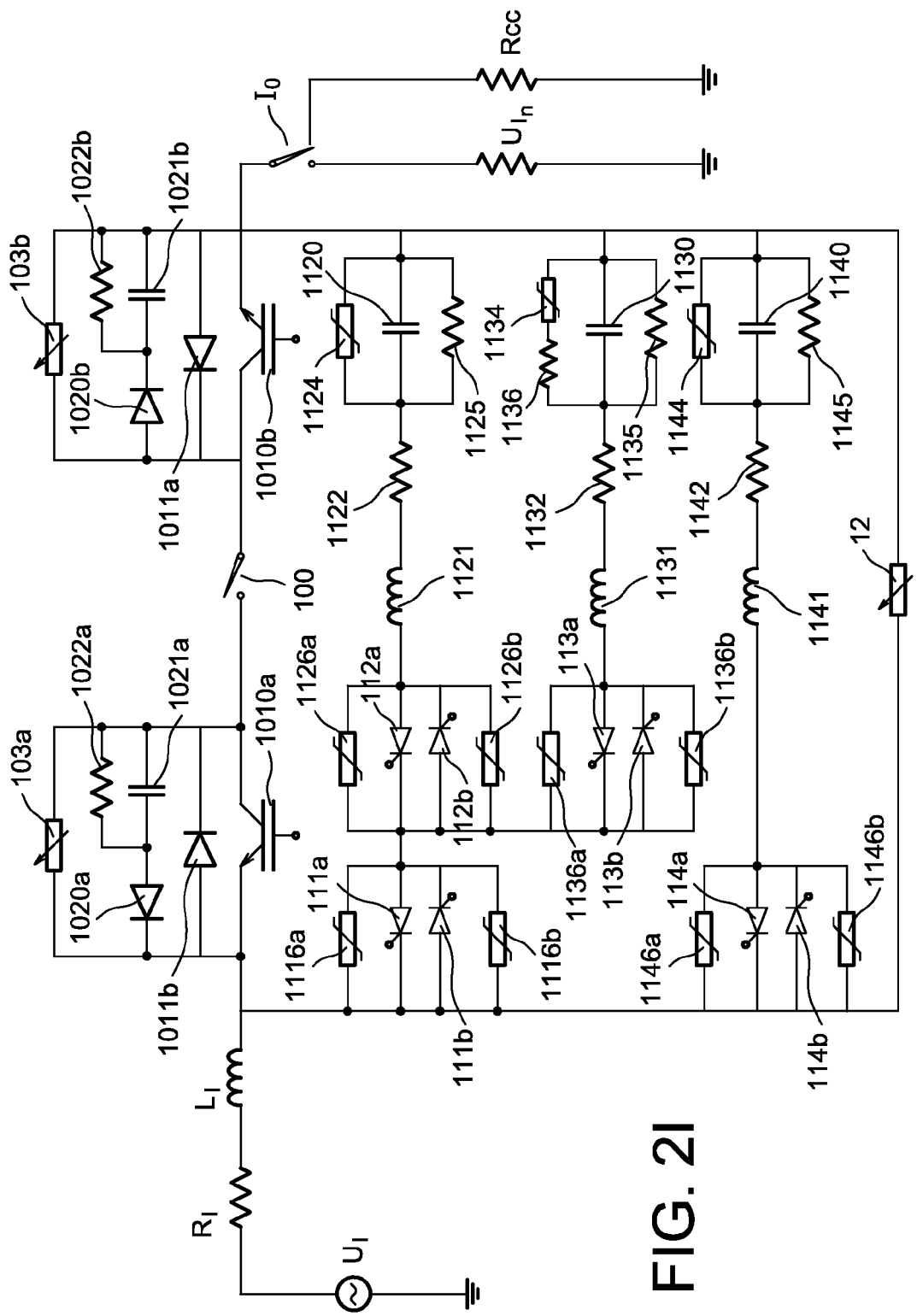
FIG. 2I is an electrical circuit diagram of a first embodiment of the hybrid circuit-breaker device of the invention.

Note also that FIGS. 2 to 2I show only one sub-branch of only one main module in the main branch 10, which is all that is therefore described herein.

Note also that FIGS. 2 to 2I show only a single mechanical switch-disconnector 100 but in fact there may be a plurality of mechanical switch-disconnectors connected in series, and that the linear and non-linear components intended to coordinate isolation and the distribution of the voltages to the terminals of the mechanical switch-isolators of each of the sub-branches are not shown either. A main module 10.1 with a plurality of sub-branches, of switch-disconnectors in series, and the associated linear and non-linear components is described below with reference to FIGS. 5 to 6C.

Note also that FIGS. 2 to 2I show only a single power thyristor at each location concerned, whereas in fact there are a plurality of thyristors in cascade. Only one of said thyristors is therefore described.

Note finally that a power transistor as such is merely symbolically represented in FIGS. 2 to 2H without showing its associated transfer capacitors and gate control device. FIG. 2I shows in parallel with the terminals of each power thyristor 111a, 111b; 112a, 112b; 113a, 113b; 114a, 114b a respective voltage surge limiter (surge arrester) 1116a, 1116b; 1126a, 1126b; 1136a, 1136b; 1146a, 1146b. With a plurality of power thyristors in cascade, there is provided a plurality of voltage surge limiters electrically in series with each other, said plurality of voltage surge limiters electrically in parallel with the plurality of power thyristors concerned. Each voltage surge limiter (surge arrester) 1116a, 1116b; 1126a, 1126b; 1136a, 1136b; 1146a, 1146b thus has the function of distributing the recovery voltage to each power thyristor.

The main branch 10 comprises a mechanical switch-disconnector 100 electrically in series with a breaker cell 101a. This breaker cell 101a is constituted of an insulated gate bipolar transistor (IGBT) 1010a in anti-parallel with a diode 1011b. The breaker cells 101a, 101b are preferably mounted at the end of the main branch 10 on either side of the mechanical switch-disconnector(s) 100.

Electrically in parallel with the breaker cell 101a is a limiter 102a for the rate of increase of voltage. The rate of increase limiter is constituted of a diode 1020a electrically in series with a capacitor 1021a, itself electrically in parallel with its discharge resistor 1022a. The capacitor 1020a controls the rate of increase of the voltage at its terminals when the IGBT transistor 101a is switched to the OFF state. The diode 102a prevents violent discharging of the capacitor 1021a when the IGBT transistor 101a begins to conduct. Finally, the resistor 1022a enables slow discharging of the capacitor 1021a. In other words, this voltage limiter 102a associated with the IGBT transistor 1010a protects the IGBT by controlling the rate at which the voltage across its terminals increases when it switches from the conducting (ON) state to the non-conducting (OFF) state. This limitation of the rate of voltage increase also has a beneficial effect for switching the current from the main branch to the auxiliary branch, in the sense that it contributes to controlling the di/dt of the current in said branch.

Also electrically in parallel with the breaker cell 101a is a voltage surge limiter 103a. It is designed to limit the voltage to a value less than the withstand voltage of the IGBT transistor 101a. For an IGBT transistor 101a with a withstand voltage of 3300 V, it is typical to set a maximum voltage value equal to 2800 V limited by the limiter 103a.

The auxiliary branch 11 comprises a first timing sub-branch 11.1 comprising a plurality of power thyristors 111a in cascade.

A second timing sub-branch 11.2, extending the first timing sub-branch 11.1, comprises a first switching-assistance module M1 with a first capacitor 1120, a first inductor 1121, and a first resistor 1122 electrically in series with the first capacitor, itself electrically in parallel with its discharge resistor 1125. An auxiliary voltage surge limiter 1124 is electrically in parallel with the capacitor 1120 and simultaneously protects it and its discharge resistor 1125 as well as defining and limiting the voltage that appears at the terminals of the auxiliary branch when the primary current flows through the second timing sub-branch 11.2.

Note here that the inductor 1121 and the resistor 1122 are not essential: their values depend on the overall values of the distributed constants of the first timing sub-branch 11.1 and of the timing sub-branch 11.2 defined at least by the intrinsic resistances and leakage inductances.

A third timing sub-branch 11.3, electrically in parallel with the second timing sub-branch 11.2, comprises, in an analogous manner to the second timing sub-branch, a second switching-assistance module M2 with a second capacitor 1130, a second inductor 1131, and a second resistor 1132 electrically in series with the second capacitor, itself electrically in parallel with its discharge resistor 1135. An auxiliary voltage surge limiter 1134 is electrically in parallel with the capacitor 1130 and simultaneously protects it and its discharge resistor 1135 as well as defining and limiting the voltage that appears at the terminals of the auxiliary branch when the primary current flows through the third timing sub-branch 11.3. Furthermore, an additional resistor 1136 is provided electrically in series with the second auxiliary voltage surge limiter 1134, this resistor enabling adjustment, as a function of the characteristics of the auxiliary voltage surge limiter 1134, the evolution of the voltage that appears at the terminals of the auxiliary branch when the primary current flows through the third timing sub-branch 11.3

Note here that the resistor 1136 may be omitted if the characteristics of the auxiliary voltage surge limiter 1134 are intrinsically suited to what is required.

Note here also that the inductor 1131 and the resistor 1132 are not essential: their values depend on the overall values of the distributed constants of the first timing sub-branch 11.1 and the timing sub-branch 11.3, defined at least by the intrinsic resistances and leakage inductances.

Finally, the auxiliary branch 11 comprises an arming sub-branch 11.4 also comprising a plurality of power thyristors 114a in cascade and a third switching-assistance module M3 analogous to the first two switching-assistance modules M1 and M2. To be more precise, this third switching-assistance module M3 comprises a third capacitor 1140, a third inductor 1141, and a third resistor 1142 electrically in series with the third capacitor, itself electrically in parallel with its discharge resistor 1145. An auxiliary voltage surge limiter 1144 is electrically in parallel with the capacitor 1140 and simultaneously protects it and its discharge resistor 1145 when the primary current flows through the main voltage surge limiter 12.

Note that this auxiliary voltage surge limiter 1144 is not essential for operation of the mechatronic circuit-breaker and that its striking voltage is chosen to be greater than that of the main voltage surge limiter 12. However, it is preferable to have one, because for large high-voltage electrical switchgear local voltage surges may occur at high frequencies even if the voltage at the terminals of the system is limited by other means, as here with the main voltage surge limiter 12.

Note also here that the resistor 1142 and the inductor 1141 are not essential: their values depend on the overall values of the distributed constants of the arming sub-branch 11.4, defined at least by the intrinsic resistances and leakage inductances.

Finally, a main voltage surge limiter 12 is connected electrically parallel to the main and the auxiliary branches 10 and 11. This voltage surge limiter is rated for the voltage of the network L in which the mechatronic circuit-breaker 1 is inserted and the energy necessary to absorb and dissipate on extinction of the current in the event of a fault, as explained below. Of course, account is taken of isolation coordination.

Thus the operation of the mechatronic circuit-breaker device 1 is described with reference to FIGS. 2A to 2H showing the various sequences with the resulting equivalent electrical circuit diagrams in the particular situation of the occurrence of a fault, noting that the same sequences follow on in succession when opening results from a specific instruction.

Figure 3:
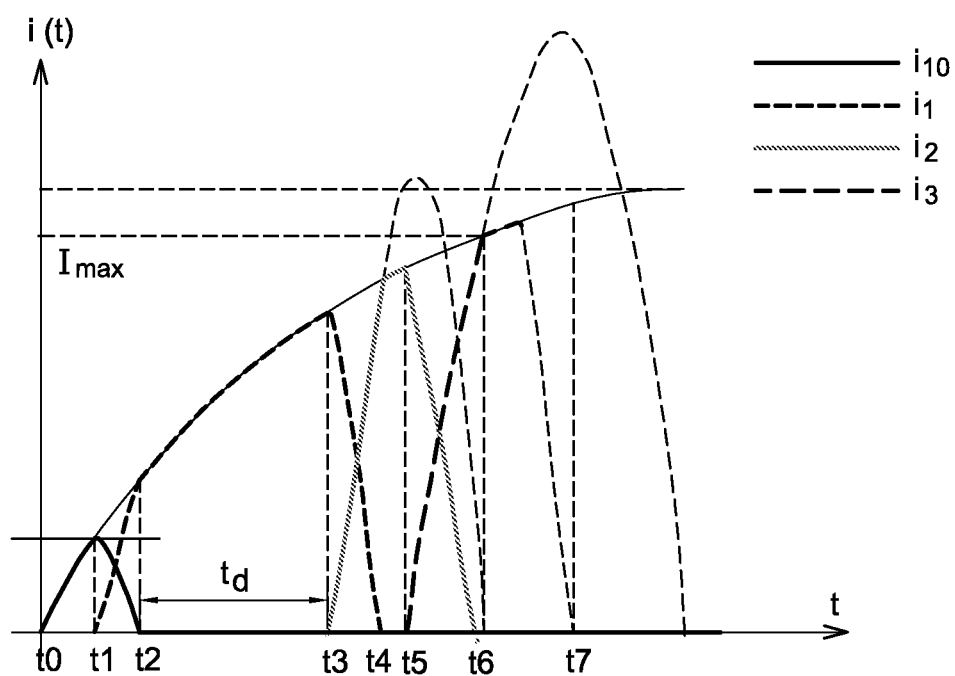
FIG. 3 shows curves of the currents in the various branches of the FIG. 2 mechatronic circuit-breaker as a function of time correlated with the various steps of FIGS. 2A to 2H.

FIG. 3 shows representative curves of the current values in the various sub-branches as a function of time.

Under steady conditions, i.e. in normal operation of the network L, before the time t1 in FIG. 3, all the IGBT transistors 1010a of the main branch are in the ON (conducting) state, and all the current then passes through them (current $i_{10}$ in FIG. 2A).

In the event of a fault occurring in the network L at the time t1 in FIG. 3 and being reflected by a current surge (from right to left in FIG. 2), the monitoring and control system switches the IGBT transistors 1010a from their ON state to their OFF state. The current is then switched from the IGBT transistors 1010a to their voltage surge limiters 103a. This switching is effected progressively because of the presence of the limiter 102a limiting the rate of increase of the voltage. There then occurs a fast increase in the voltage at the terminals of the main branch 10 and the auxiliary branch 11. Synchronously with this, driving energy is automatically supplied to the gate control modules of the power thyristors 111a, 112a, and 113a. This energy, taken from the network L, enables conduction to be started in the power thyristors 111a, 112a when the time comes. Still synchronously, and at a time very slightly later than t2 in FIG. 3, the monitoring and control system sends a status report request, preferably via optical fiber, to all the gate control modules of the power thyristors 111a, 112a, and 113a.

If the monitoring and control system receives in return, again preferably via optical fiber, confirmation that all of the gate control modules of the power thyristors 111a, 112a, and 113a have received a sufficient level of energy and are in a position to exercise their function, then it sends, again preferably by optical fiber, the instruction to start conduction in the power thyristors 111a, 112a, and simultaneously sends the mechanical switch-disconnector 100, again preferably by optical fiber, the instruction to open. Opening begins only after a delay much greater than the time difference t2−t1 in FIG. 3, given the mechanical inertia of the mechanical switch-disconnector 100. This is why it is given its instruction to open in advance by the monitoring and control system, in order to reduce the overall operating time of the mechatronic circuit-breaker.

If, beyond a specified latency time, the monitoring and control system does not receive in return confirmation that all the gate control modules of the power thyristors 111a, 112a, and 113a have received a sufficient energy level and are in a position to exercise their function, it then sends remote fault signaling and sends no conduction instruction either to the power thyristors or to the mechanical switch-disconnector 100, and then executes a strategy to render the mechatronic circuit-breaker 1 safe.

After this time t1, the current is thus diverted from the main branch 10 and thus enters the timing sub-branches 11.1 and 11.2 (FIG. 2B). During a transient period, i.e. until the time t2 in FIG. 3, the current increases from a zero value to the value of the current in the network L. Complete diversion is ensured by the values of the RLC system constituted by the inductor 1121, the resistors 1122 and 1125, and the capacitor 1120 determined so as to have an oscillatory transient regime between the main branch 10 and the timing sub-branches 11.1 and 11.2 concerned. This oscillatory transient regime is a condition firstly for fast switching of the current from the main branch 10 to the timing sub-branches 11.1 and 11.2 and secondly to limit the di/dt of the current to a level lower than the level that can be accepted by the power thyristors 111a and 112a.

At the time t2 in FIG. 3, all of the current has therefore been diverted into the sub-branches 11.1 and 11.2 (FIG. 2C).

Because of the rating of the electronic components of the timing sub-branches 11.1, 11.2, this topology persists for a particular time period td necessary for opening the mechanical switch-disconnector 100 and for enabling it to withstand a first voltage level at the terminals. The inventors have preferred to set a very short period td in the range 200 μs to 2000 μs sufficient for an actuator to open sufficiently a mechanical-switch disconnector 100 consisting of two vacuum interrupters electrically in series, this actuator being that described and claimed in the patent application filed this day in the name of the applicant, WO 2013/092878, published Jun. 27, 2013, and entitled "Actionneur à aimants permanents et interrupteur mécanique actionné par un tel actionneur" ["Permanent magnet actuator and mechanical switch actuated by such an actuator"].

The voltage surge limiter 103a and the auxiliary voltage surge limiter 1124 are respectively rated so that, when the primary current is well-established in the timing sub-branches 11.1 and 11.2, i.e. at the end of a time slightly after t2 but much before t3 in FIG. 3, the amplitude of the residual current in the main branch 10 is substantially zero, typically much less than 1 A, so as to enable the vacuum interrupters of the mechanical switch-disconnector 100 to open without significant electrical erosion, because of the virtual absence of electrical arcing.

At the time t3 equal to t2 plus the period td, in FIG. 3, the power thyristors 113a of the third timing sub-branch 11.3 are switched by the monitoring and control system from their OFF state to their ON state. The current is then diverted in this sub-branch (FIG. 2D). The current $i_2$ in this sub-branch 11.3 then increases from a zero value to the value of the current in the line L in this sub-branch (FIG. 2E) at the time t4 in FIG. 3. Complete diversion of the current is ensured by the values of RLC system constituted by the inductor 1131, the resistors 1132 and 1135, and the capacitor 1130 determined to result in an oscillatory regime between the timing sub-branch 11.2 and the timing sub-branch 11.3 concerned. This oscillatory transient regime is a necessary condition firstly for fast switching of the current from the timing sub-branch 11.2 to the timing sub-branches 11.3 and secondly to limit the di/dt of the current to a level lower than the level that can be accepted by the power thyristors 113a. At this time $t_4$, the power thyristors 112a turn themselves off (switching to the OFF state), because of the transient reverse bias applied by the capacitor 1120, and there is no longer any current in the sub-branch 11.2.

This reverse bias being of short duration, the power thyristors 112a are adapted to have a very short turn-off time and to be able to withstand their full forward recovery voltage in a time in the range a few microseconds to a few tens of microseconds. The same applies, for the same reasons, to the power thyristors 111a and 113a.

During this time period between the times t4 and t5 in FIG. 3, the voltage at the terminals of the auxiliary branch 11 increases from the initial value defined by the auxiliary voltage surge limiter 1124 to a value essentially defined by the auxiliary voltage surge limiter 1134 and its associated resistor 1136, when present.

Depending on the voltage levels of the network L in which the mechatronic circuit-breaker 1 of the invention is installed, the ratio between these final and initial voltages may typically vary in the range 5 to 20.

Figure 5:
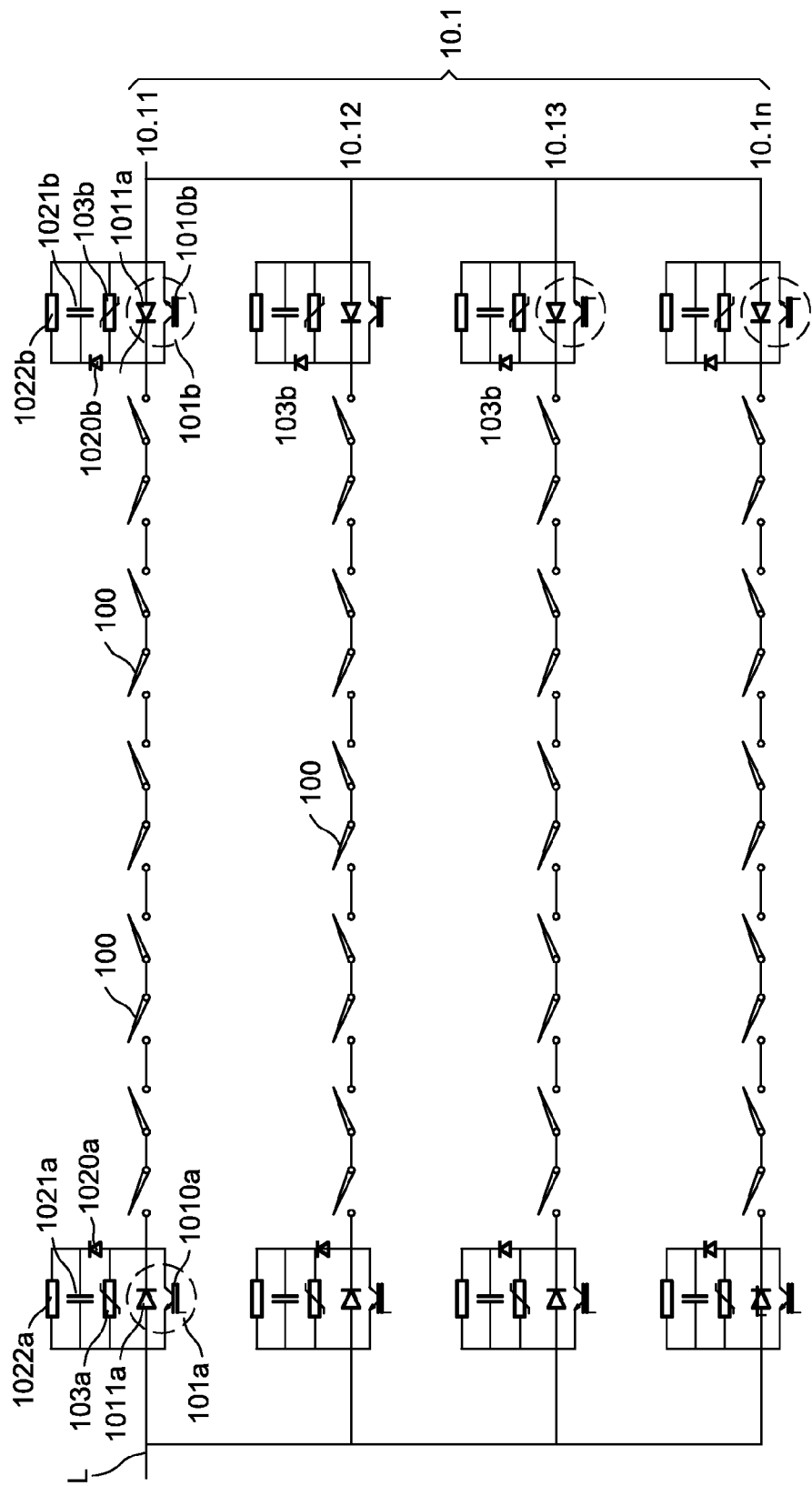
FIG. 5 is an electrical circuit diagram of one embodiment of a main module of a main branch of a mechatronic circuit-breaker device of the invention.

For such a voltage increase at the terminals of the auxiliary branch 11 to be possible, the time t3 in FIG. 5 is determined so that the opening of the mechanical switch-disconnector 100 is sufficient to enable it to withstand this voltage.

This voltage increase at the terminals of the auxiliary branch 11 firstly facilitates future switching of the current to the arming branch 11.4, the large size of which at very high voltages implies high leakage inductances and therefore requires high switching voltages, given the high value that the primary fault current may reach, typically when its rate of increase reaches or exceeds 10 A/μs.

It also allows automatic delivery of sufficient energy to the gate control modules of the power thyristors 114a of the arming branch 11.4. This energy taken from the network L enables conduction to be started in the power thyristors 114a at the appropriate time.

At a time slightly before t5 in FIG. 3, the monitoring and control system sends, preferably via optical fiber, all the gate control modules of the power thyristors 114a a status report request.

If the monitoring and control system receives in return, again preferably via optical fiber, confirmation that all the gate control modules of the power thyristors 114a have received a sufficient level of energy and are in a position to exercise their function, then at the time t5 in FIG. 3 it sends, again preferably via optical fiber, the order to start conduction in the power thyristors 114a.

If, beyond a specified latency time, the monitoring and control system does not receive in return confirmation that all of the gate control modules of the power thyristors 114a have received a sufficient level of energy and are in a position to exercise their function, it then sends a fault report and does not send any conduction instruction to the power thyristors 114a; it then executes a strategy to render the mechatronic circuit-breaker safe.

After the time t4, i.e. at the time t5 in FIG. 3, the monitoring and control system switches the power thyristors 114a of the arming sub-branch 11.4 from their OFF state to their ON state, resulting in rapid charging of the capacitor 1140. The current is then diverted into this sub-branch 11.4 (FIG. 2F). The current $i_3$ in this sub-branch 11.4 then increases from a zero value to the value of the current in the line L in this sub-branch (FIG. 2G) at the time t6 in FIG. 3. Complete diversion of the current is ensured by the values of the RLC system constituted by the inductor 1141, the resistors 1142 and 1145, and the capacitor 1140, and the values of the RLC system of the timing sub-branches 11.1, 11.3 as determined to produce an oscillatory transient regime between said sub-branches 11.1, 11.3 and the arming sub-branch 11.4 concerned. This oscillatory transient regime is a condition firstly for fast switching of the current from the timing sub-branches 11.1, 11.3 to the arming sub-branch 11.4 and secondly, for limiting the di/dt of the current to a level lower than the level that can be accepted by the power thyristors 114a. At this time t6, the power thyristors 111a and 113a turn themselves OFF (switch to the OFF state) because of the transient reverse bias applied by the capacitor 1130, and there is no longer any current in their respective sub-branches 11.1 and 11.3.

Since this reverse bias is of short duration, the power thyristors 111a and 113a are adapted to have a very short turn-off time and to be capable of withstanding their full forward recovery voltage in a time in the range from a few microseconds to a few tens of microseconds.

From this time t6, the capacitor 1140 of the arming sub-branch 11.4 continues to charge until it reaches the triggering voltage of the main voltage surge limiter 12. Because of the effect of the reactive energy of the network L, this voltage then continues to increase slightly in accordance with a law determined by the characteristic of the main voltage surge limiter 12. At the same time, the primary current is transferred from the arming sub-branch 11.4 to the main voltage surge limiter 12, which absorbs the reactive energy of the network L.

This series insertion into the network L of a high-voltage energy absorbing element 12 induces a decrease in the primary current at a rate that increases with increasing striking voltage of the main voltage surge limiter 12 compared to the nominal voltage of the network L. The ratio between the striking voltage of the main voltage surge limiter 12 and the nominal voltage of the network L may typically be chosen in the range 1 to 4, for example 2, depending on the nominal voltage of the network L.

At a time t6 in FIG. 3, the reactive energy of the network L is no longer sufficient to maintain the high voltage surge level imposed by the main voltage surge limiter 12, and the voltage at its terminals rapidly decreases. At the same time, the voltage at the terminals of the capacitor 1140, which will have reached a maximum close to that of the main voltage surge limiter 12, will decrease more slowly, at a rate imposed by its discharge resistor 1145, which is specifically rated for these two rates of decrease to be clearly different. As a result of this, at a given time, the voltage at the terminals of the capacitor 1140 will be higher than that present at the terminals of the main voltage surge limiter 12. The capacitor 1140 will thus apply a transient reverse bias to the thyristors 114a.

Note that the auxiliary voltage surge limiter 1144, having a striking voltage higher than that of the main voltage surge limiter 12, plays no part in the sequence that has just been described.

At the time t7 in FIG. 3, the power thyristors 114a turn themselves OFF (switch to the OFF state) because of the transient reverse bias applied by the capacitor 1140, and there is no longer any current in the arming sub-branch 11.4

Beyond this time t7 in FIG. 3, no current flows either in the main branch 10 or in the auxiliary branch 11, apart from residual leakage currents caused by imperfections of the components present in all switchgear inserted in series into a high-voltage network. These currents are if necessary eliminated by conventional isolation means electrically in series with the mechatronic circuit-breaker, as explained below with reference to FIG. 4. The primary current is then entirely diverted into the main voltage surge limiter 12, and the equivalent circuit diagram of the system is that shown in FIG. 2H. At the end of a time period that decreases as the ratio between the striking voltage of the main limiter 12 and the nominal voltage of the network increases, the primary current is reduced to the leakage currents of the mechatronic circuit-breaker: breaking is achieved (FIG. 2H).

For its part, the capacitor 1140 initially charged to a high voltage level is discharged into its discharge resistor 1145.

Figure 4:
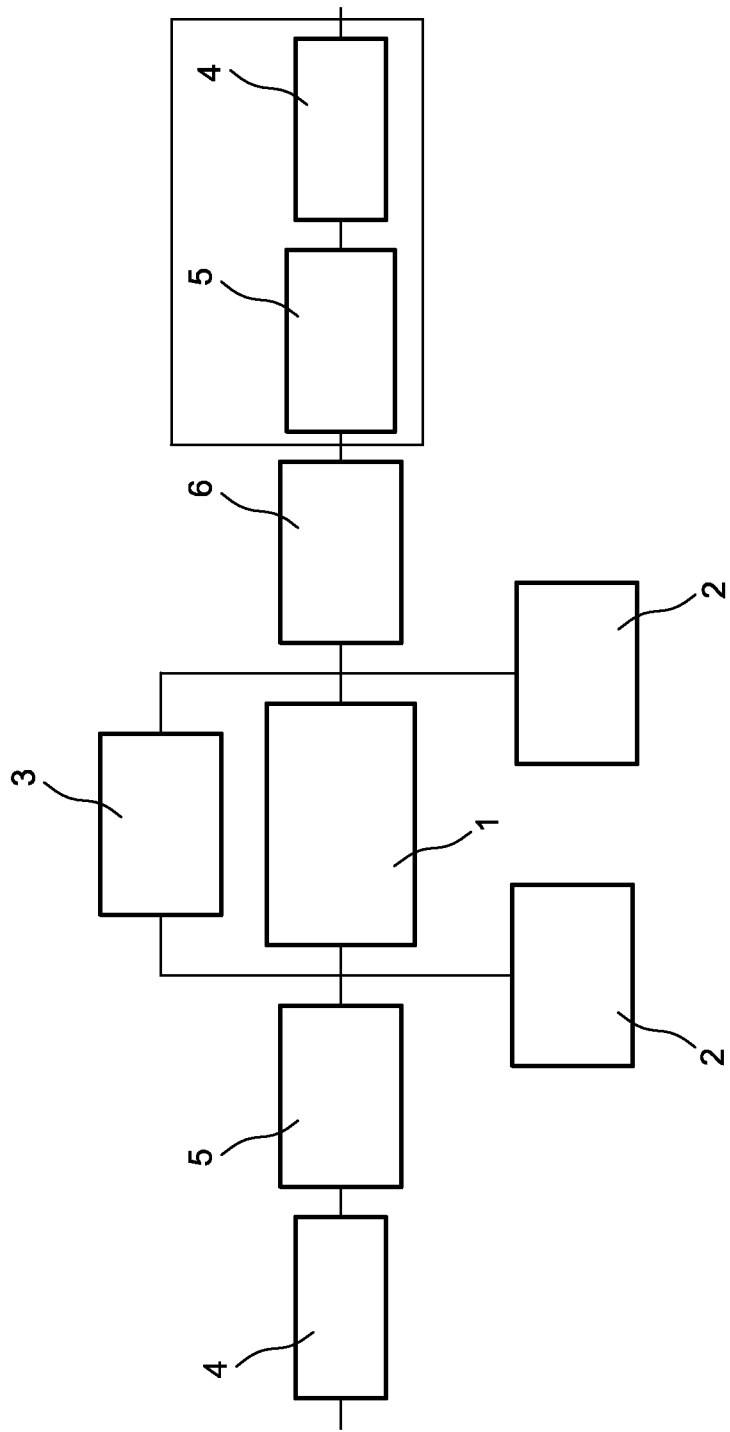
FIG. 4 is a block diagram of an overall architecture of a set of electrical switchgear including a mechatronic circuit-breaker device of the invention.

FIG. 4 shows a set of electrical switchgear integrated into a high-power high-voltage direct current electricity transmission network and including a mechatronic circuit-breaker 1 as described above.

The additional electrical switchgear 2, 3, 4, 5 complements the performance of the circuit-breaker 1 by virtue of auxiliary functions adapted:
  to enable maintenance of the circuit-breaker in total safety;
  to make its operation more reliable by not subjecting it to electrical stresses when it has broken the current;
  to limit switching currents;
  to enable breaking of low currents; and
  to authorize, on command, the passage of currents greater than its breaking capacity.

Thus there is first provided on either side of the terminals of the circuit-breaker a grounding switch 2 which in its closed position grounds the connecting terminals of the main branch 10 and the auxiliary branch 11 for maintenance operations. In normal operation, the grounding switch 2 is obviously open and must provide the isolation between terminals and ground.

There is also provided a bridging switch 3 electrically in parallel with the terminals of the mechatronic circuit-breaker and adapted, on command and for a particular time, to cause to pass from one terminal to the other of the mechatronic circuit-breaker 1, without passing through it, a transient current higher than the breaking capacity of the mechatronic circuit-breaker 1.

A disconnector 4 is electrically in series with the mechatronic circuit-breaker 1 externally of the electrical connection terminals of the grounding switch 2. Its function in its open position is to provide the dielectric strength between terminals and between terminals and ground. In its closed position, it provides the electrical continuity of the main branch 10. Associated with a grounding switch 2, it thus enables the mechatronic circuit-breaker 1 to be made safe for maintenance operations. Thus any human intervention on the hybrid circuit-breaker 1 requires opening of the disconnector 4 and grounding.

A resistor insertion switch 5 is electrically in series between each disconnector 4 and the mechatronic circuit-breaker 1: this switch 5 is adapted to limit the switching current on closure if there is a potential difference at the terminals at the moment of closure.

Finally, an additional circuit-breaker 6 is provided electrically in series with the mechatronic circuit-breaker 1 of the invention to break low currents. Depending on the alternating current or direct current applications, different technologies are used to produce such an additional circuit-breaker. In direct current applications, the circuit-breaker 6 may be produced using a technology comparable to that of metal return transfer breakers (MRTB). These circuit-breakers are currently used in a AC/DC and DC/AC converter stations operating at very high voltages. In alternating current applications, the circuit-breaker 6 may be produced using a technology comparable to that of alternating current circuit-breaker used in very-high-voltage substations. Thus it may be a circuit-breaker using arc extinction by an insulative gas such as $SF_6$.

FIG. 5 shows an embodiment of a main branch 10 of a mechatronic circuit-breaker of the invention. The branch 10 comprises a single main module 10.1 constituted of a plurality of identical sub-branches 10.11, 10.12, ..., 10.1n electrically in parallel with each other. The number of main modules is a function of the primary current in transit in the network L. The inventors typically employ a mechatronic circuit-breaker device 1 with a parallel module 10.1 including twelve sub-branches 10.11, 10.12, ..., 10.1n in parallel to cater for, or transmit, a steady current of 1500 A. The parallel connection of two or three such main modules 10.1 enables steady currents of 3000 A or 4500 A, respectively.

Each sub-branch comprises a plurality of mechanical switch-disconnectors 100 electrically in series with each other and two identical breaker cells 101a, 101b also electrically in series with the switches 100 but connected in anti-parallel so that each of them is dedicated to one direction of the current. This kind of parallel connection between the plurality of sub-branches 10.11, 10.12, ..., 10.1n has a plurality of considerable advantages.

Figure 5A:
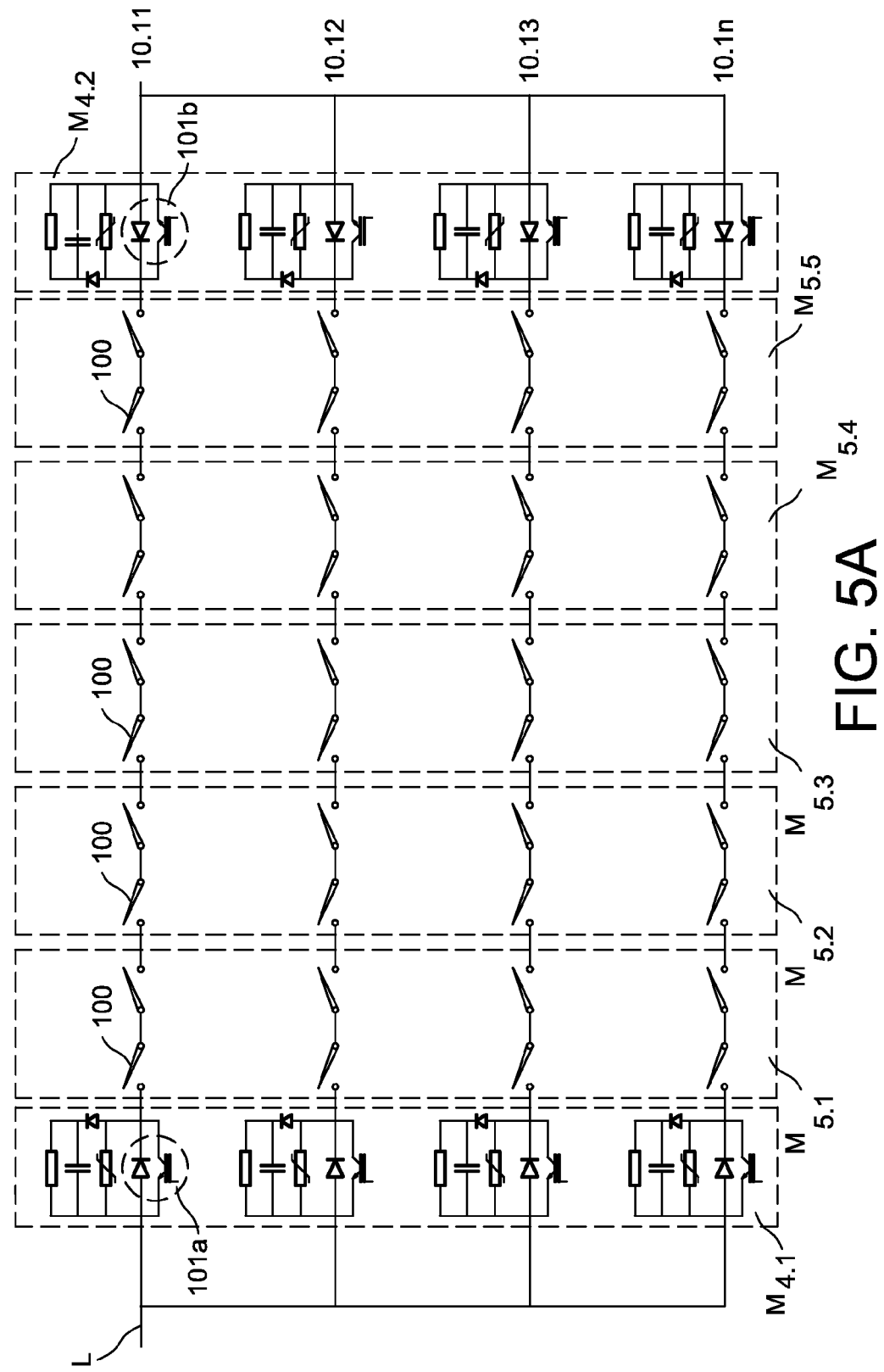
FIG. 5A is an electrical circuit diagram of a variant of a main module as shown in FIG. 5 in which the module is of modular structure.

The breaker cells 101a, 101b situated on the same side of a sub-branch 10.11, 10.12 may be grouped into a single physical entity to constitute an electronic switching-assistance sub-module M4.1, M4.2, as shown in dashed line in FIG. 5A.

Each of two electronic switching-assistance sub-modules M4.1, M4.2 then combines on a single conductor the currents of the various parallel sub-branches.

Each of the two electronic switching-assistance sub-modules M4.1, M4.2 is able to balance the currents of each of the parallel sub-branches by the method described above, the proximity of the breaker cells when combined in a single entity facilitating telemetry and comparison of these currents.

Since each of the electronic switching-assistance sub-modules M4.1, M4.2 is liable to be called upon for an operation only in a very limited manner, means may be provided for storing the energy necessary for rapid activation or deactivation of its breaker cells. Moreover, the equipment in the electronic switching-assistance sub-modules M4.1, M4.2 is designed on the basis of low-consumption electronic components, thus minimizing the electrical power necessary for it to operate in the absence of load, which advantageously makes it possible to supply them with power by the transmission of electromagnetic waves from a unit situated on the ground, and not subjected to the high voltage, the connection then being effected via either waveguides or a beam. These waves may be either so-called millimeter waves in the microwave spectrum or light waves in the infrared spectrum, in a wavelength window from 750 nm to 1600 nm. These waves are preferably guided by doped silica optical fibers with insulative sheaths.

Figure 6:
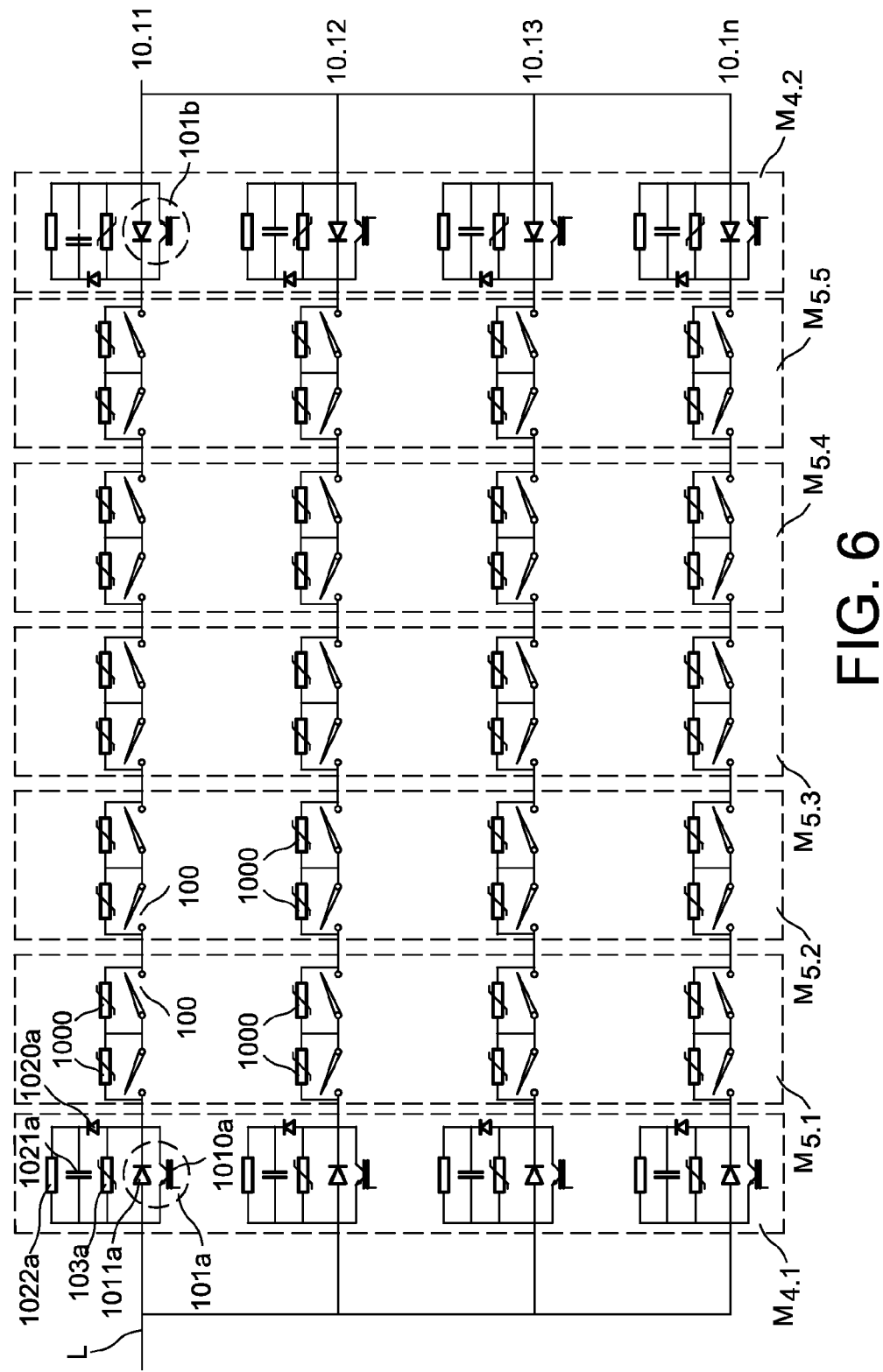
FIG. 6 is an electrical circuit diagram of an embodiment of a main module from FIG. 5 also of modular structure.
Figure 6A:
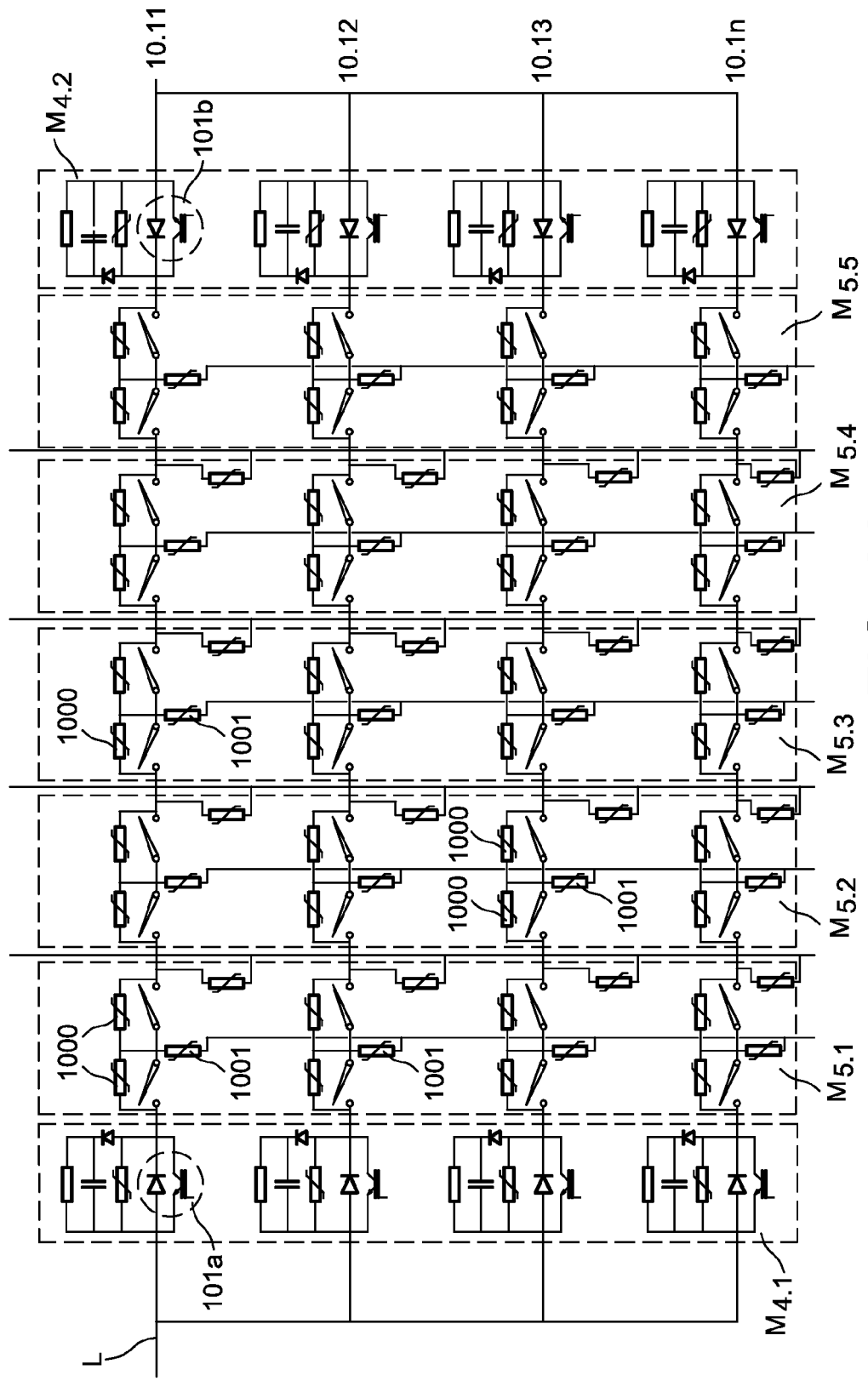
FIG. 6A is an electrical circuit diagram of a variant of a main module as shown in FIG. 6.

In a similar way, the mechanical switch-disconnectors 100 of the various sub-branches may be grouped into modules M5.1, M5.2, M5.3, M5.4, M5.5 as symbolically shown in dashed line in FIGS. 5A, 6 and 6A. This has the advantage of making it possible to confer a modular structure on the mechatronic circuit-breaker of the invention, each electromagnetic actuator module of the invention being described and claimed in the patent application filed the same day as the present application, WO 2013/092878, published Jun. 27, 2013, and entitled "Actionneur à aimants permanents et interrupteur mécanique actionné par un tel actionneur" ["Permanent magnet actuator and mechanical switch actuated by such an actuator"]. Thus the mechatronic circuit-breaker may be used at higher or lower voltage levels depending on the number of modules electrically in series.

FIG. 6 shows a preferred embodiment of the mechanical switch-disconnectors 100 constituted by a vacuum interrupter (not shown) and wherein each vacuum interrupter is equipped with a shunt voltage surge limiter 1000 adapted to divide the voltage in sufficiently uniform manner between all the interrupters connected in series in the same sub-branch when they are in the open position and/or to limit the maximum voltages to which each of the interrupters is subjected. The total number of interrupters in series in the same sub-branch is preferably greater than that strictly required so that failure of one or two interrupters, i.e. the incapacity thereof to withstand the voltage in the open position, is without consequences for the functioning of the mechatronic circuit-breaker of the invention. In other words, it is a matter here of a coordination function for the purpose also of taking account of the risks of one or more vacuum interrupters being unable to withstand the voltage. The non-linear systems that the voltage surge limiters 1000 constitute may be individually replaced by respective high-value resistors, to allow only a negligible residual current to pass, of the order of a few mA, for example. It may also be a matter of a capacitor or a combination of the voltage surge limiter 1000, a high-value resistor and, where appropriate, a capacitor.

FIG. 6A shows an advantageous variant of the preferred embodiment described above. In this variant, the mid-points of two interrupters 100 of each sub-branch of the same mechanical switch-disconnector module M5.1, M5.2, M5.3, M5.4, M5.5 are connected to a common point of that module via a linear or non-linear resistor 1001 adapted to limit the electrical potential differences between these mid-points of the same mechanical switch-disconnector module.

Figure 7:
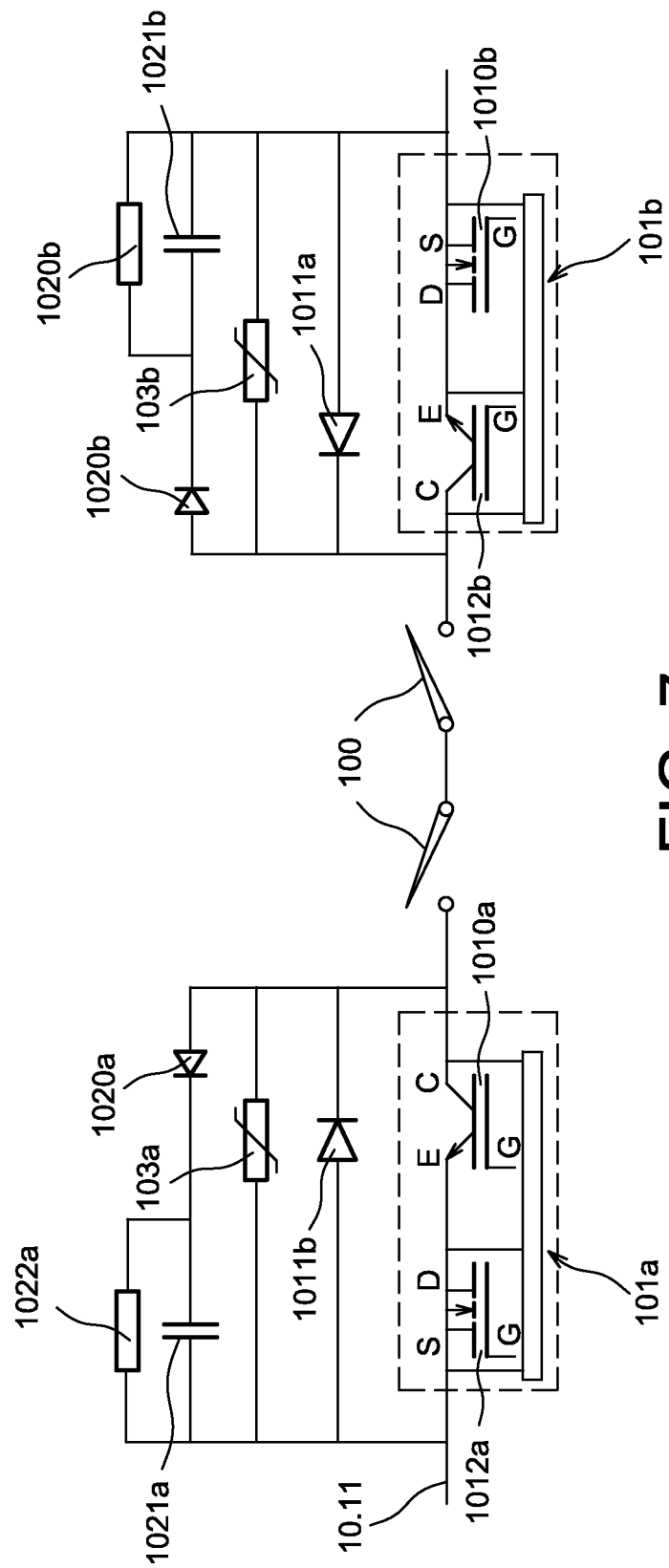
FIG. 7 is an electrical circuit diagram of a variant of a breaker cell of the invention.

FIG. 7 shows an advantageous variant of the breaker cells 101a, 101b and their integration into a sub-branch 10.11 of a main branch 10 of the invention. In this variant, the controlled duty ratio power semiconductor element of a breaker cell 101a, 101b is constituted by at least one field-effect transistor 1012a, 1012b and an insulated gate bipolar transistor (IGBT) 1010a, 1010b electrically in series with the field-effect transistor. Thus the drain D of the field-effect transistor 1012a, 1012b is connected to the emitter E of the IGBT transistor 1010a, 1010b while their gates G are connected to a control circuit ensuring overall switching behavior similar to that of the circuit usually known as a cascode circuit. Furthermore, the advantage of neutralizing the Miller effect caused by the stray collector-gate capacitance of the IGBT in such a cascode circuit has, in the context of the invention, the advantage of making the control circuit reliable by not subjecting it to the effects of high-frequency interference that might be injected into the main branch by the primary network.

Many improvements may be made without departing from the scope of the invention.

Accordingly, as already explained above, the architecture of the invention shown in FIG. 2 is designed to break a current that may arrive in one direction or the opposite direction via the high-voltage line L. In an application in which the current to be broken always flows in the same direction, the architecture may be simplified by eliminating all the electronic components that are duplicated in FIG. 2, i.e. all those designated with the same index a or b.

The invention claimed is:

1. A mechatronic circuit-breaker device adapted to break an electrical current flowing through electrical power transmission means, the device comprising:
    a main branch comprising at least one main module comprising at least one sub-branch comprising at least one mechanical switch-disconnector connected in series with at least one breaker cell constituted of at least one power semiconductor element with controlled duty ratio;
    an auxiliary branch electrically in parallel with the main branch and comprising:
    at least one first sub-branch, called the timing sub-branch, and comprising at least one first breaker cell comprising a plurality of power thyristors in cascade, at least one of the timing sub-branches further comprising at least one first switching-assistance module with at least one first capacitor, electrically in parallel with its discharge resistance and a voltage surge limiter; and
    a second sub-branch, called the arming sub-branch, electrically in parallel with the timing sub-branch and comprising at least one second breaker cell constituted of a plurality of power thyristors in cascade and at least one second switching-aid module with at least one second capacitor electrically in parallel with its discharge resistor; and
    at least one main voltage surge limiter electrically in parallel with the main branch.

2. A mechatronic circuit-breaker according to claim 1, wherein each sub-branch of a main module comprises at least one mechanical switch-disconnector connected in series between two breaker cells connected in anti-parallel with each other and using power semiconductors.

3. A mechatronic circuit-breaker according to claim 1, further comprising a rate of voltage increase limiter electrically in parallel with each breaker cell of a main module, the rate of increase limiter being comprising a diode electrically in series with a capacitor itself electrically in parallel with its discharge resistor.

4. A mechatronic circuit-breaker according to claim 1, further comprising a voltage surge limiter electrically in parallel with each breaker cell of a main module.

5. A mechatronic circuit-breaker according to claim 1, wherein each breaker cell of a sub-branch of a main module comprises at least one power semiconductor element with a controlled rate of conduction and wherein each sub-branch of a main module comprises a diode connected in anti-parallel with a breaker cell.

6. A mechatronic circuit-breaker according to claim 1, wherein the power semiconductor component with control duty ratios of a breaker cell of a main module is an insulated gate bipolar transistor (IGBT).

7. A mechatronic circuit-breaker according to claim 1, wherein the controlled duty ratio power semiconductor element of a breaker cell of a sub-branch of a main module comprises at least one field-effect transistor and an insulated gate bipolar transistor (IGBT) connected electrically in series with the field-effect transistor by connecting the drain of the field-effect transistor to the emitter of the IGBT transistor, their gates G being connected to a control circuit ensuring switching behavior of the cascode circuit type.

8. A mechatronic circuit-breaker according to claim 1, wherein the main branch comprises a plurality of main modules electrically in parallel with each other.

9. A mechatronic circuit-breaker according to claim 1, wherein each main module includes a plurality of sub-branches electrically in parallel with each other.

10. A mechatronic circuit-breaker according to claim 1, wherein the auxiliary branch comprises at least two timing sub-branches electrically in parallel with each other, the second timing sub-branch comprising at least one third breaker cell comprises a plurality of power thyristors in cascade and at least one third switching-aid module with at least one third capacitor, at least one third inductor, and at least one third resistor electrically in series with the third capacitor, itself electrically in parallel with its discharge resistor and a voltage surge limiter itself in series with a resistor.

11. A mechatronic circuit-breaker according to claim 1, wherein each mechanical switch-disconnector of each sub-branch of each main module comprises two vacuum interrupters electrically in series.

12. A set of electrical switchgear intended to be installed in high-voltage alternating current or direct current electrical energy transmission means, comprising a mechatronic circuit-breaker according to any preceding claim and at least one electrical grounding switch connected in series with each of the two terminals of the mechatronic circuit-breaker.

13. A set of electrical switchgear according to claim 12, comprising a bridging switch connected electrically in parallel to the terminals of the mechatronic circuit-breaker and adapted on command and for a particular time period to cause a transient current greater than the breaking capacity of the mechatronic circuit-breaker to flow from one terminal to the other of the circuit-breaker without passing therethrough.

14. A set of electrical switchgear according to claim 12, comprising on either side of the terminals of the hybrid circuit-breaker a disconnector electrically in series with the mechatronic circuit-breaker and externally of the electrical connecting terminals of the grounding switches.

15. A set of electrical switchgear according to claim 14, comprising, between an electrical connecting terminal of a grounding switch and a disconnector, a switch for inserting an electrical resistor in electrical series with said disconnector.

16. A set of electrical switchgear according to of claim 12, comprising an additional circuit-breaker electrically in series with the mechatronic circuit-breaker device, the additional circuit-breaker being adapted to break low currents.

17. A set of electrical switchgear according to claim 16, wherein the additional circuit-breaker is a metallic return transfer breaker (MRTB).

18. A set of electrical switchgear according to claim 16, wherein the additional circuit-breaker is of the mechanical arc-extinction type.

19. A set of electrical switchgear according to claim 12, wherein the switchgear and additional circuit-breaker are of modular design individually or in combination.

20. A method triggering a mechatronic circuit-breaker device according to claim 1, wherein only in the presence of a steady current in the main branch, and in the absence of a specific instruction, each switch-disconnector is maintained in the closed position and the set or sets of controlled duty ratio power semiconductors in the ON state and the set of power thyristors of the auxiliary branch in the OFF state, and wherein either in the event of a current surge in the main branch of the device or on reception of a specific instruction, it comprises the following steps:

a) switching from the ON state to an OFF state of the controlled duty ratio power semiconductor element or elements whilst maintaining each switch-disconnector closed so as to divert all of the current into the at least one timing sub-branch for a time period necessary for each mechanical switch-disconnector to open;

b) synchronously with the step a), switching power thyristors of at least one timing sub-branch from the OFF state to an ON state to achieve a voltage level at the terminals of the main branch and of the auxiliary branch enabling current to flow neither in the main branch nor in the arming branch nor in the voltage surge limiter, to enable subsequent switching from the OFF state to an ON state of the power thyristors of the arming branch in the open position of each mechanical switch-disconnector, and allowing subsequent switching from the ON state to the OFF state of the power thyristors of the at least one timing sub-branch in the open position of each mechanical switch-disconnector;

c) when step b) has been completed, opening each mechanical switch-disconnector;

d) when step c) has been completed and when mechanical switch-disconnector has reached its open position, switching the power thyristors of the arming sub-branch from the OFF state to an ON state to achieve a voltage level at its terminals enabling diversion of all of the current to the voltage surge limiter or limiters;

e) extinction of the current by the main voltage surge limiter or limiters.

21. A triggering method according to claim 20, wherein there is further executed a step f) of eliminating any residual leakage currents by opening at least one disconnector.

* * * * *